United States Patent [19]
Wada et al.

[11] Patent Number: 5,343,254
[45] Date of Patent: Aug. 30, 1994

[54] IMAGE SIGNAL PROCESSING DEVICE CAPABLE OF SUPPRESSING NONUNIFORMITY OF ILLUMINATION

[75] Inventors: Toru Wada; Yasuhiro Komiya, both of Tokyo; Tatsuo Nagasaki, Yokohama, all of Japan

[73] Assignee: Olympus Optical Co., Ltd., Tokyo, Japan

[21] Appl. No.: 863,441

[22] Filed: Apr. 3, 1992

[30] Foreign Application Priority Data

Apr. 25, 1991 [JP] Japan .................. 3-095872
Oct. 14, 1991 [JP] Japan .................. 3-264995
Feb. 27, 1992 [JP] Japan .................. 4-041451

[51] Int. Cl.$^5$ .............................. H04N 5/21
[52] U.S. Cl. ........................... 348/627; 348/71; 348/252; 348/678
[58] Field of Search ............ 358/169, 168, 27, 29, 358/98, 164, 32; 348/71, 252, 627, 678; H04N 7/18, 5/205, 5/21

[56] References Cited

U.S. PATENT DOCUMENTS

| 4,584,606 | 4/1986 | Nagasaki . |
| 4,926,247 | 5/1990 | Nagasaki et al. . |
| 5,034,888 | 7/1991 | Uehara et al. ............. 358/98 X |

FOREIGN PATENT DOCUMENTS 62-132479  6/1987  Japan .

Primary Examiner—Victor R. Kostak
Attorney, Agent, or Firm—Frishauf, Holtz, Goodman & Woodward

[57] ABSTRACT

An image signal processing device includes a logarithmic compression circuit, filtering circuit, filtering characteristic setting circuit and dynamic range/gain control circuit. The logarithmic compression circuit subjects an input image signal containing a color signal to the logarithmic compression. The filtering circuit serves to filter the input image signal. The filtering characteristic setting circuit adaptively sets the band pass characteristic of the filtering circuit according to the feature of the input image signal. The dynamic range/gain control circuit controls the dynamic range and gain of the filtered input image signal.

16 Claims, 23 Drawing Sheets

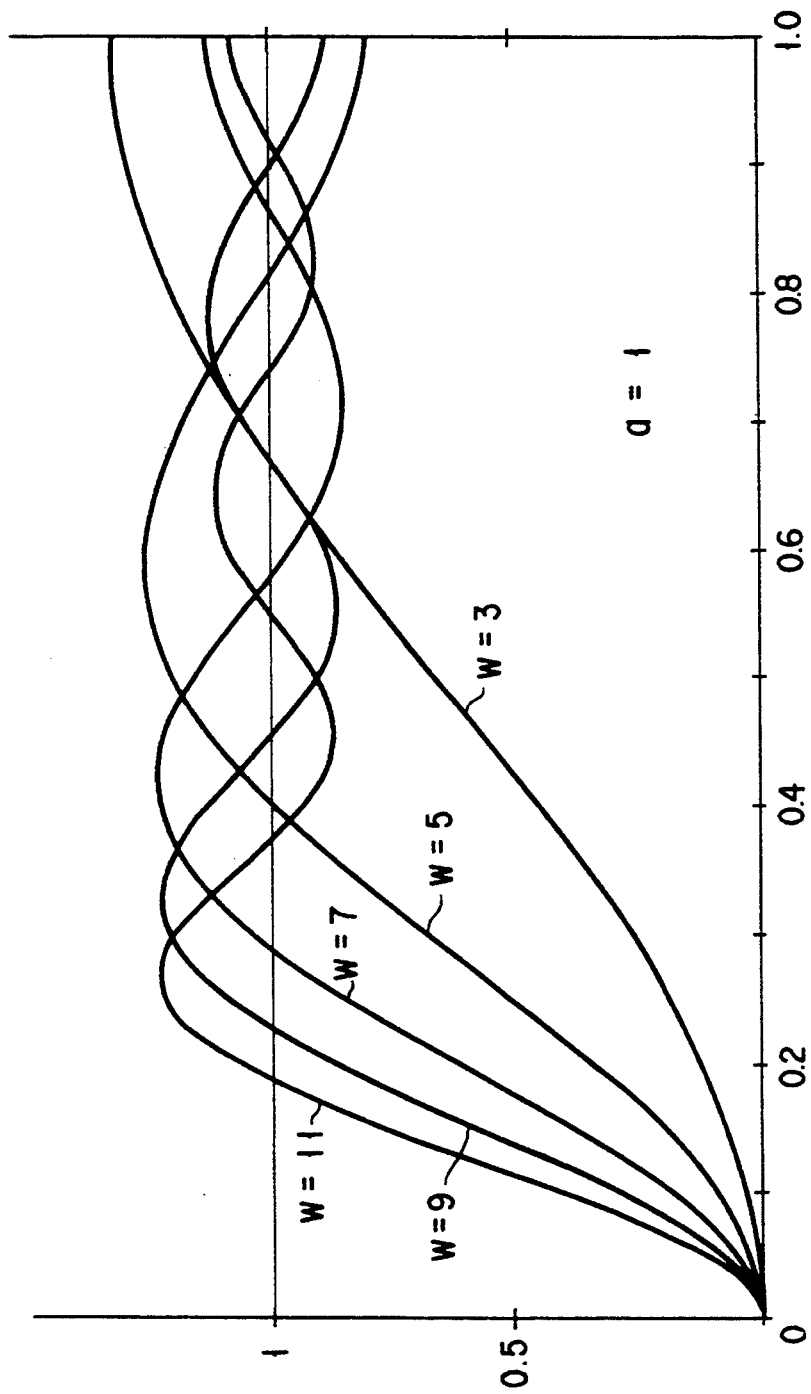
F I G. 5

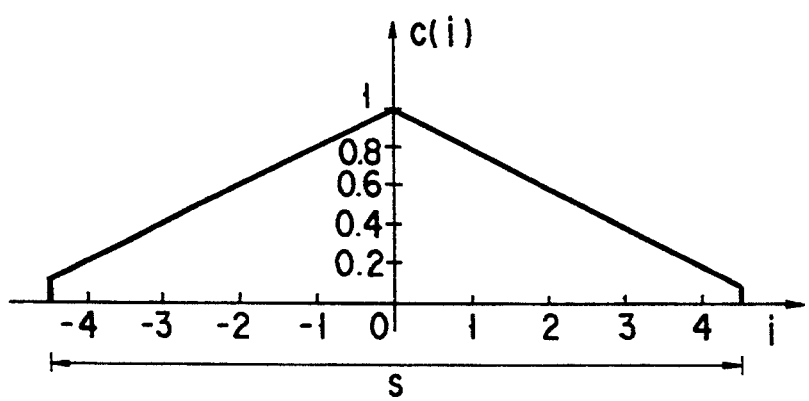
F I G. 7

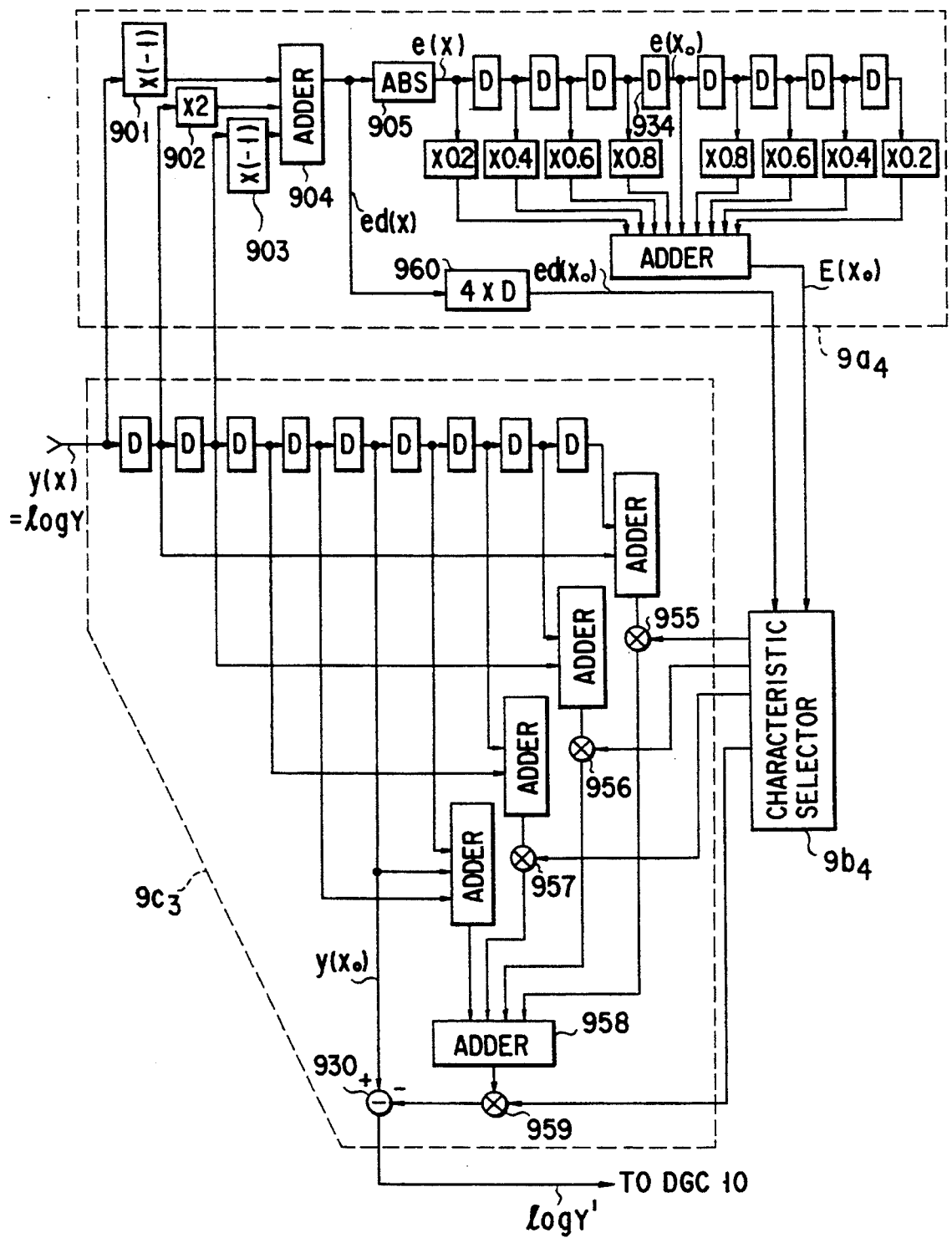
F I G. 9

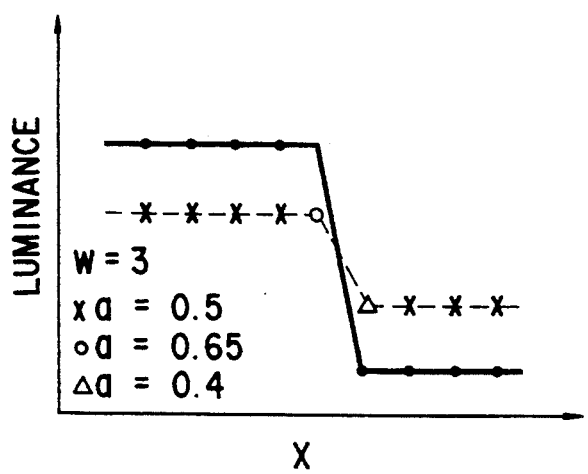
F I G. 12
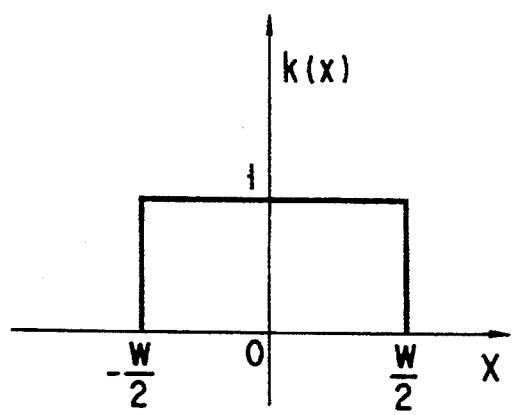
F I G. 13

| | EDGE INFORMATION SIGNAL E(x) SMALL ⟶ LARGE | | | |
|---|---|---|---|---|
| LOCAL AVERAGE WIDTH | 9 | 7 | 5 | 3 |

|  | EDGE INFORMATION SIGNAL E(x) SMALL ⟵⎯⎯⎯⎯⎯⎯⎯⎯⟶ LARGE ||||
|---|---|---|---|---|
| OUTPUT TO MULTIPLIER 955 | 1 | 0 | 0 | 0 |
| OUTPUT TO MULTIPLIER 956 | 1 | 1 | 0 | 0 |
| OUTPUT TO MULTIPLIER 957 | 1 | 1 | 1 | 0 |
| OUTPUT TO MULTIPLIER 958 | $\frac{a}{9}$ | $\frac{a}{7}$ | $\frac{a}{5}$ | $\frac{a}{3}$ |

F I G. 16

|  | EDGE DIRECTION SIGNAL ed(x) SMALL ⟶ 0 ⟶ LARGE |
|---|---|
| VALUE OF COEFFICIENT a | 0.3 ⟶ 0.5 ⟶ 0.7 |

F I G. 17

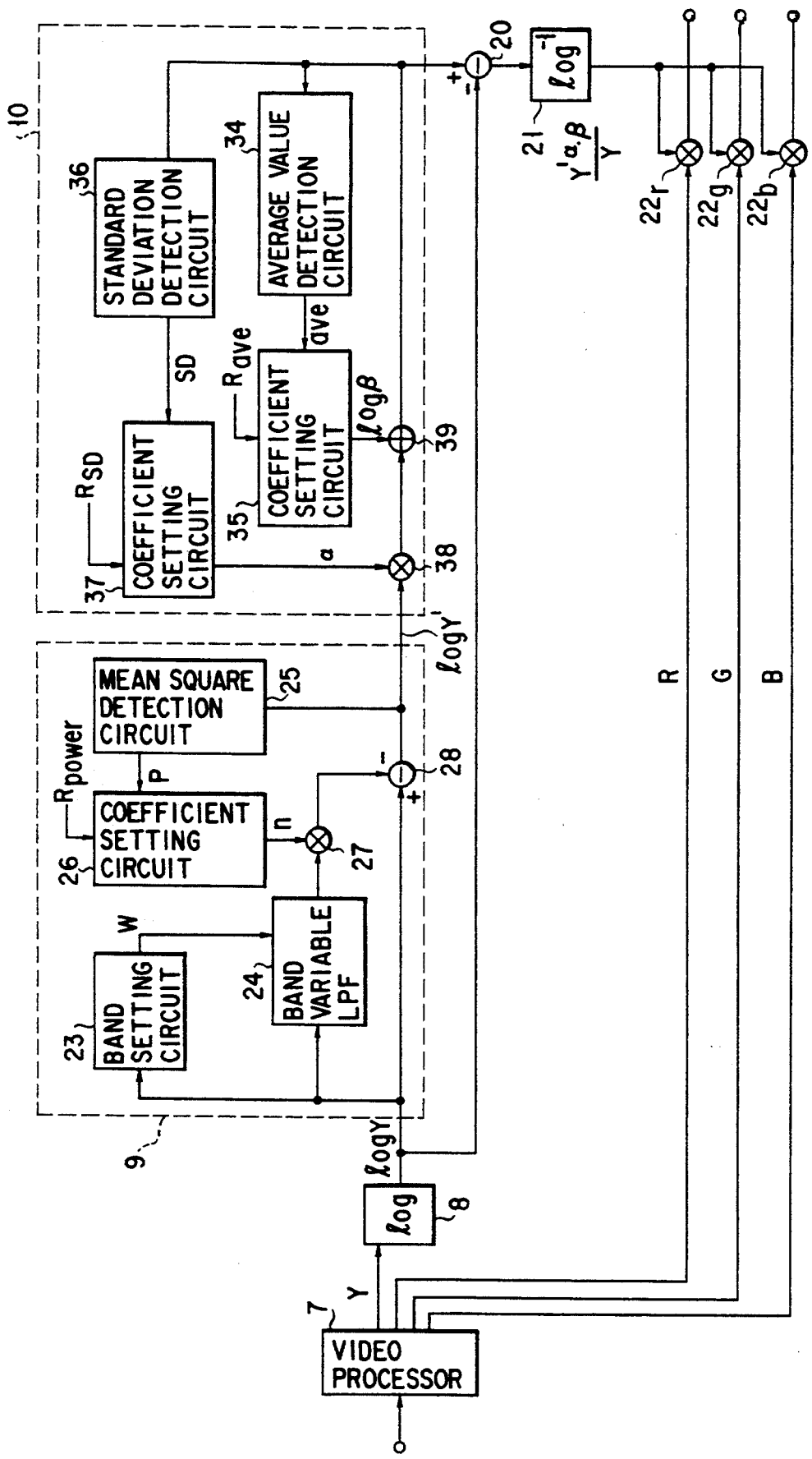
F I G. 18

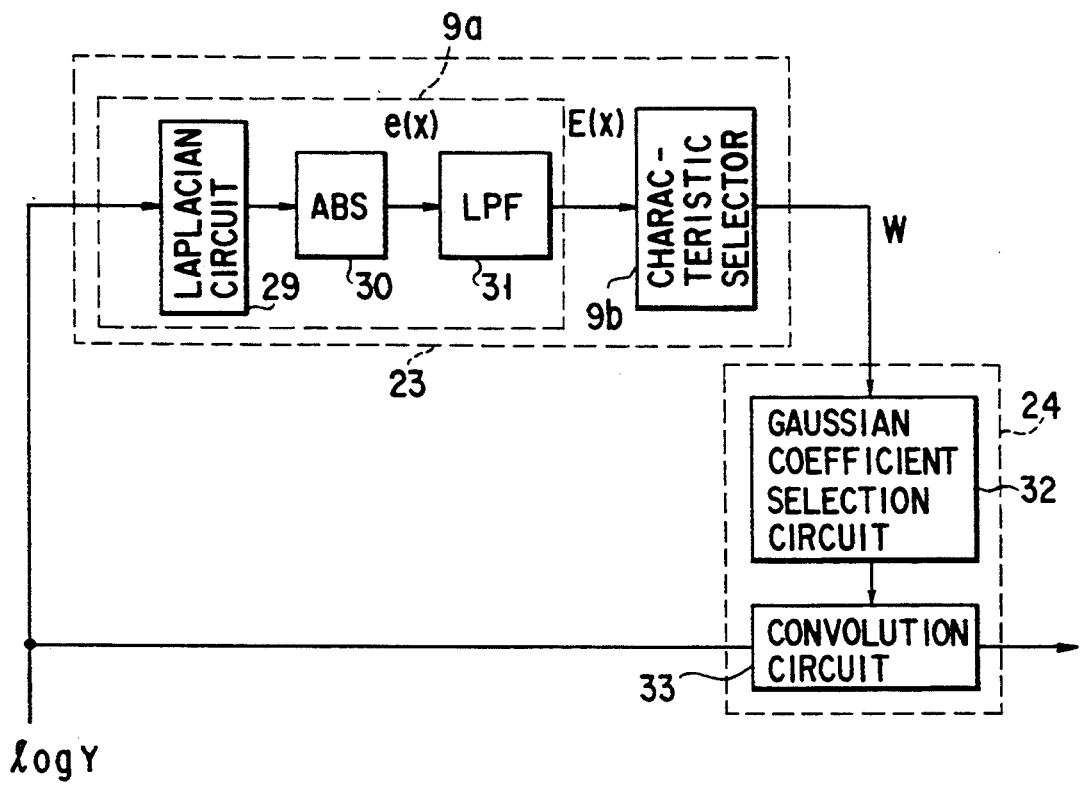
F I G. 19
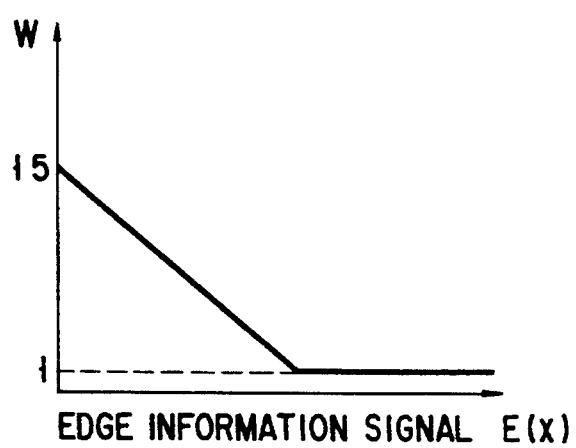
F I G. 20

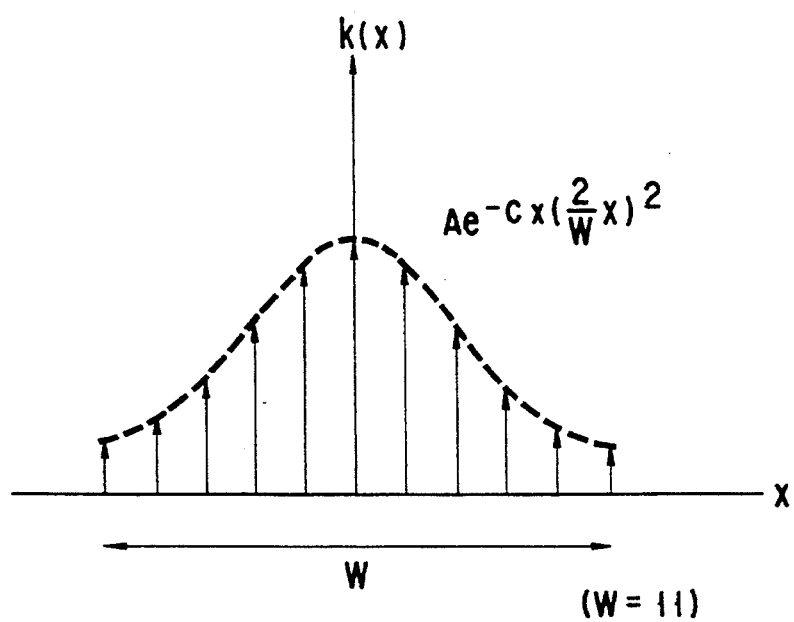
F I G. 21
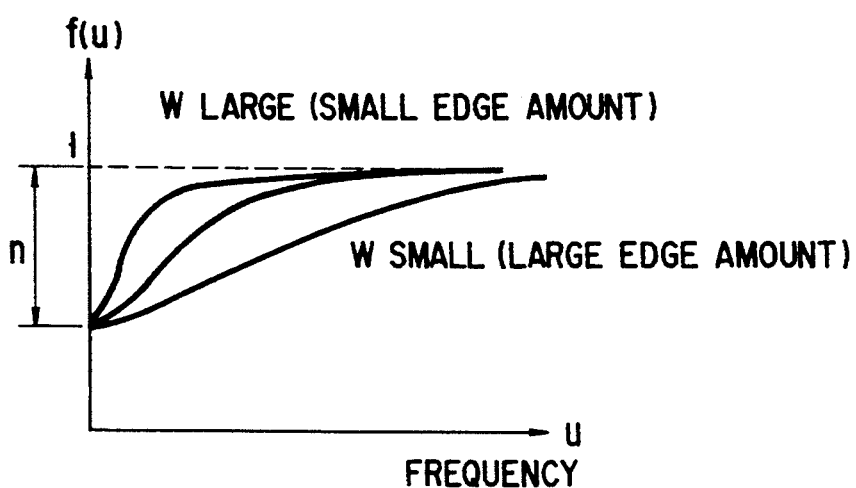
F I G. 22

$$\frac{1}{9} \quad \frac{1}{9} \quad \frac{1}{9}$$

$$\frac{1}{9} \quad \frac{1}{9} \quad \frac{1}{9}$$

$$\frac{1}{9} \quad \frac{1}{9} \quad \frac{1}{9}$$

FIG. 26

$$-1 \quad -1 \quad -1$$

$$-1 \quad 8 \quad -1$$

$$-1 \quad -1 \quad -1$$

FIG. 27

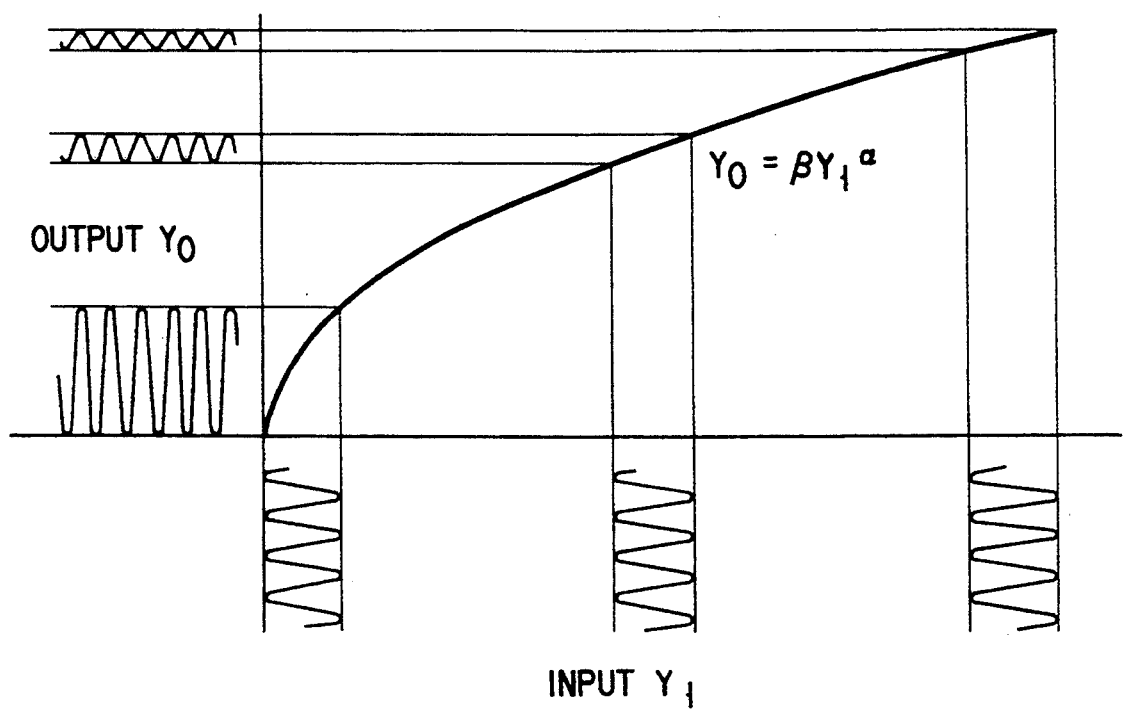
F I G. 28

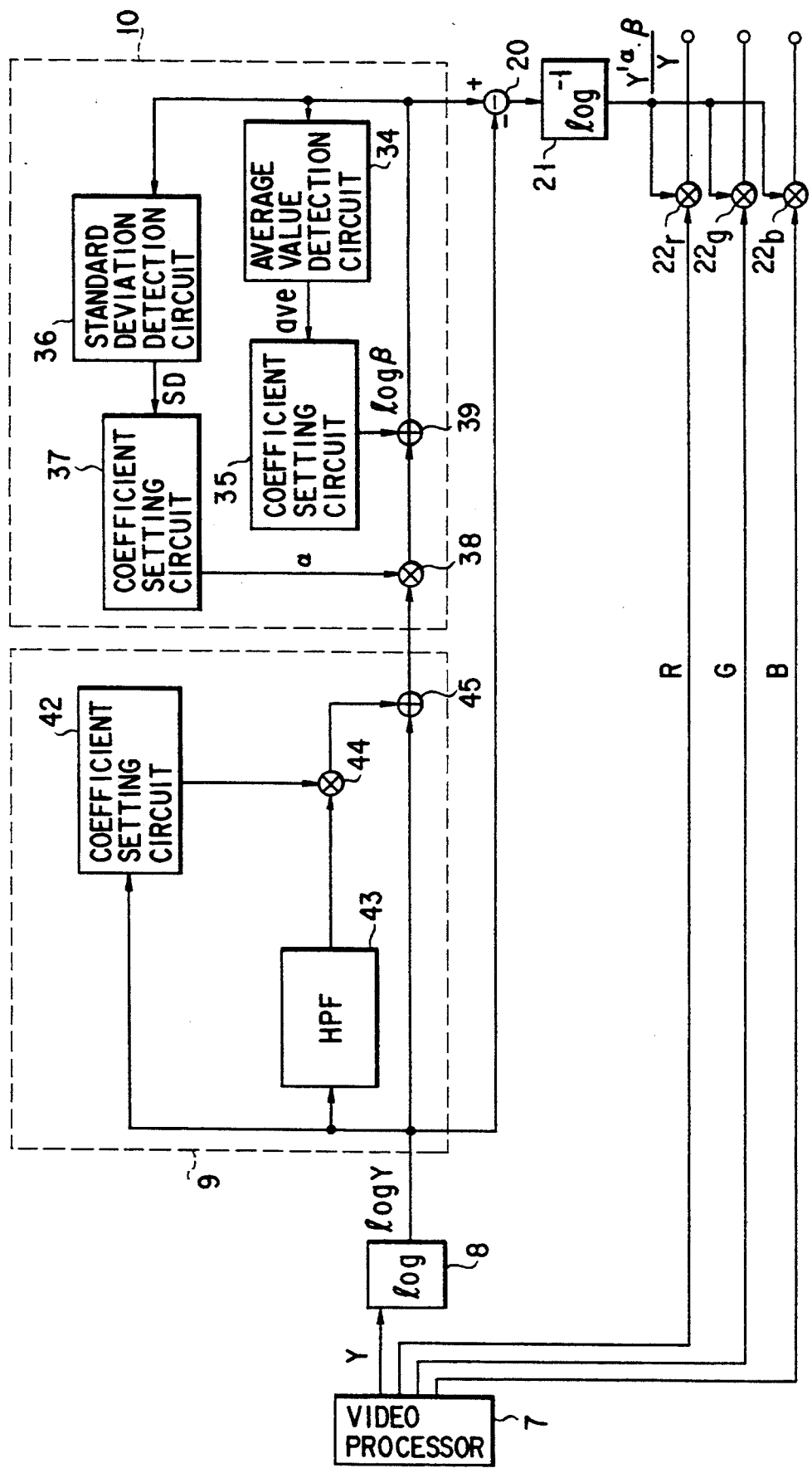
F I G. 29

IMAGE SIGNAL PROCESSING DEVICE CAPABLE OF SUPPRESSING NONUNIFORMITY OF ILLUMINATION

BACKGROUND OF THE INVENTION

1. Field of the Invention

This invention relates to an image signal processing device for effecting an image processing operation for suppressing nonuniformity of illumination or the like.

2. Description of the Related Art

In a general CRT monitor, the dynamic range for display is approx. 46 dB. Therefore, even when an image having a wider dynamic range or an image having a large difference in brightness between bright and dark portions is displayed, the bright and dark portions of the image cannot be correctly displayed at the same time.

For example, in an image created by an electronic endoscope (which is hereinafter referred to as an electronic scope) for displaying an electrical image signal obtained by photoelectric conversion using a solid state imaging device such as a CCD on a CRT display monitor, significant nonuniformity of illumination may be caused by a difference in distance between a light source and objects to be illuminated since the light source is substantially a point light source and, in the same image, strong halation may be caused on an object which lies near the light source and an object which is far from the light source is dark and nothing can be observed.

As a means for solving the above problem, an image signal correction circuit using a 2-dimensional filter as shown in Japanese Patent Disclosure No. 62-132479 was proposed.

In the above image signal correction circuit, the influence of nonuniformity of illumination is alleviated by effecting a sequence of operations of subjecting a luminance signal of the image signal to the logarithmic compression so as to permit an image having a wide dynamic range to be displayed and suppressing the low frequency range of a space frequency by use of a 2-dimensional filter and then converting the same into an exponential characteristic. Suppression of the low frequency component by use of the 2-dimensional filter is significantly effective when variation in the amount of illumination light is smooth as in an endoscope.

However, in an ordinary image other than an image created by the endoscope, a large number of so-called edge portions caused by contour portions of an object or, when the illumination light of step form is used for example, will be present and, if such an image is subjected to the same process as the above-described process, the edge portion thereof is forcedly or excessively emphasized and the image cannot be observed in a natural form.

SUMMARY OF THE INVENTION

Accordingly, an object of this invention is to provide an image signal processing device capable of eliminating or suppressing nonuniformity of illumination without forcedly emphasizing the edge portion even in a position where the luminance varies in a step form.

In order to attain the above object, an image signal processing device of this invention comprises logarithmic compression means for subjecting an input image signal containing a color signal to the logarithmic compression; filtering means for filtering the input image signal which is subjected to the logarithmic compression by the logarithmic compression means; filtering characteristic setting means for adaptively setting the band pass characteristic of the filtering means according to the feature of the input image signal; and dynamic range/gain control means for controlling the dynamic range and gain of the input image signal which is filtered by the filtering means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a diagram showing variation in the filtering characteristic with variation in the local average value;

FIG. 7 is a diagram showing an example of weighting coefficients;

FIG. 9 is a diagram showing a fourth embodiment of this invention;

FIG. 12 is a diagram of waveforms obtained when the filtering coefficient is adaptively changed by use of an edge direction signal;

FIG. 13 is a diagram showing an example of a rect function;

FIG. 16 is a diagram showing the relation between an edge information signal and an output of each multiplier;

FIG. 17 is a diagram showing the relation between the edge direction signal and the coefficient;

FIG. 18 is a block diagram showing a fifth embodiment of this invention;

FIG. 19 is a diagram showing the construction of a band variable LPF circuit and a band setting circuit;

FIG. 20 is a diagram showing a characteristic output from a characteristic selection circuit;

FIG. 21 is a diagram showing the coefficient k(x) selected by a Gaussian coefficient setting circuit;

FIG. 22 is a diagram showing the band characteristic of an adaptive filter;

FIG. 26 is a diagram showing an example of a coefficient used for the convolution operation;

FIG. 27 is a diagram showing another example of a coefficient used for the convolution operation;

FIG. 28 is a diagram showing the input/output characteristic of high frequency obtained when the dynamic range is compressed;

FIG. 29 is a diagram showing the circuit construction obtained by further simplifying the circuit construction of FIG. 25;

DETAILED DESCRIPTION OF THE PREFERRED EMBODIMENT

Figure 1:
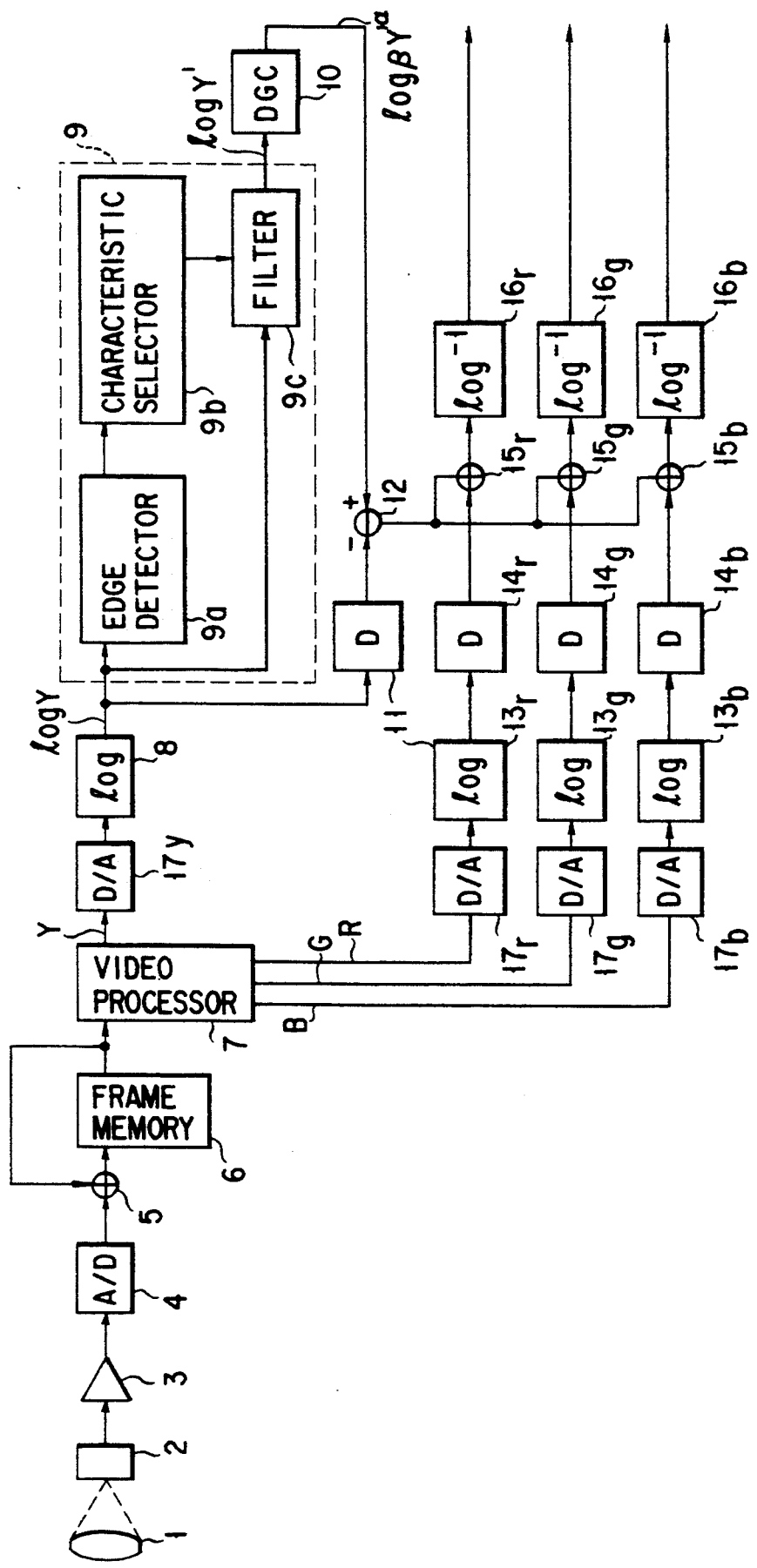
FIG. 1 is a block diagram showing a first embodiment of an electronic camera to which this invention is applied.

FIG. 1 is a block diagram of a first embodiment in which an image signal processing device of this invention is applied to an electronic camera capable of photographing an object having a wide dynamic range by use of cumulative addition.

In FIG. 1, 1 denotes an optical lens and 2 denotes a solid state imaging device for converting an image created by the optical lens into an electrical signal. An image signal output from the solid state imaging device 2 is amplified to a corresponding level by a preamplifier 3 and then coded into a digital signal by an A/D converter 4.

The digital coded image signal is supplied to a frame memory 6 via an adder 5 and sequentially stored into the frame memory 6 for each frame. The adder 5 adds an image signal stored in the frame memory 6 to an image signal of a next one of the frames sequentially read from the solid state imaging device 2 and stores the result of addition into the frame memory 6 so as to accumulatively add sequentially readout image signals in the frame memory 6. The dynamic range of the image signal can be expanded by repeatedly effecting the cumulative addition of image signals. Since the method of expanding the dynamic range in the photographing process is disclosed in Japanese Patent Application No. 1-334508 in detail, the explanation therefor is omitted here.

An object having a dynamic range of 80 dB can be photographed by the solid state imaging device 2 having a dynamic range of 50 dB, for example, by use of the above cumulative addition.

In order to display the thus obtained image signal of 80 dB on an image monitor such as a television receiver, the dynamic range of the image signal must be compressed in accordance with the dynamic range (for example, 46 dB) of the image monitor.

For this purpose, a video processor 7 is used to separate the image signal into a luminance signal Y and respective color signals R, G and B which are respectively converted into analog signals by means of D/A converters $17_y$, $17_r$, $17_g$ and $17_b$. After this, the luminance signal Y is converted into a logarithm value (log Y) by a logarithmic amplifier 8, the nonuniformity of illumination thereof is removed by use of an adaptive filter 9 (log Y'), the dynamic range of the image is adjusted in accordance with the dynamic range (46 dB) of the image monitor by using a coefficient a in a dynamic range/gain controller (DGC) 10, and then the gain used for amplifying the image signal level which has been lowered by the average value subtraction is adjusted by use of a coefficient log $\beta$ so as to derive an output signal log $\beta Y'^{\alpha}$. A signal log Y which is supplied from a delay circuit 11 having a delay time equal to time used for processing the signal in the filter 9 and DGC 10 is subtracted from the signal log $\beta Y'^{\alpha}$ in a subtracter 12. Thus, a signal of compression coefficient to be multiplied by the color signal can be created as shown by the following equation (1).

$$\log \beta Y'^{\alpha} - \log Y = \log(\beta Y'^{\alpha}/Y) \quad (1)$$

Figure 2:
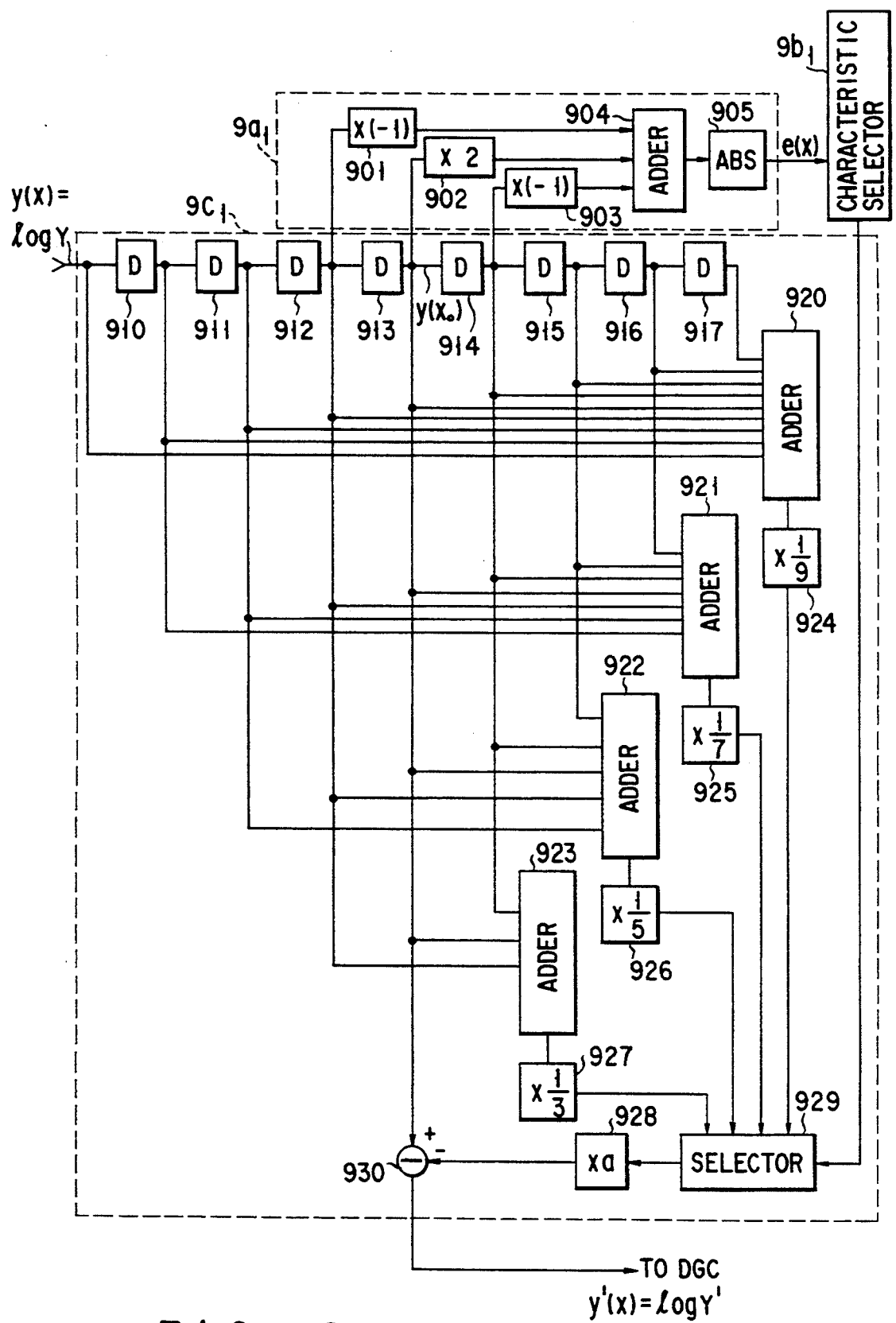
FIG. 2 is a diagram showing an example of the concrete construction of an adaptive filter shown in FIG. 1.

The adaptive filter 9 includes an edge detection circuit $9a$, characteristic selection circuit $9b_1$ and filter $9c_1$. A concrete example of the adaptive filter 9 is shown in FIG. 2. The operation of the adaptive filter 9 is explained with reference to FIG. 2.

In FIG. 2, an output log Y (=y(x), where x indicates the horizontal coordinate position of a pixel) from the logarithmic amplifier 8 is delayed by time corresponding to four pixels via delay circuits 910 to 913 of one pixel. Assume that the signal is y($x_0$). In an adder 920, signals of a total of nine pixels including the pixel y($x_0$) supplied to the delay circuit 913 and four pixels lying in each position before and after the pixel y($x_0$) are added together and then multiplied by 1/9 by means of a multiplier 924. That is, a local average value of signals of nine pixels is derived.

Likewise, a local average value of signals of a total number of seven pixels including the pixel y($x_0$) and three pixels which lie in each position before and after the pixel y($x_0$) is derived by an adder 921 and a multiplier 925, a local average value of signals of a total number of five pixels including the pixel y($x_0$) and two pixels which lie in each position before and after the pixel y($x_0$) is derived by an adder 922 and a multiplier 926, and a local average value of signals of a total number of three pixels including the pixel y($x_0$) and one pixel which lies in each position before and after the pixel y($x_0$) is derived by an adder 923 and a multiplier 927, and the thus derived local average values are input to a selector 929.

In the edge detection circuit $9a_1$ surrounded by broken lines, the central pixel y($x_0$) output from the delay circuit 913 is multiplied by 2 by means of a multiplier 902 and the pixels lying before and after the central pixel y($x_0$) are multiplied by −1 by means of multipliers 903 and 901, respectively, and then added together by means of an adder 904. The absolute value of an output of the adder 904 is derived by an absolute value circuit (ABS) 905 and is used as an edge signal e(x) indicating the size of the edge. The operation of the edge detection circuit is to effect the convolution operation by use of a coefficient (−1, 2, −1) with respect to the luminance signal y(x) and derive the absolute value of the result of the convolution operation. The operation can be expressed by the following equation (2).

$$e(x) = |y(x) * h(x)|, \quad (2)$$

where h(x) is a coefficient of (−1, 2, −1).

When e(x) is large, a large edge is present, and when e(x) is small, variation in the luminance is small. e(x) is input to the characteristic selection circuit $9b_1$. In the characteristic selection circuit $9b_1$, a signal is supplied to the selector 929 according to the magnitude of e(x). In the selector 929, one of the four average values including local average widths 3, 5, 7 and 9 can be selected when e(x) is large, a signal which causes the local average width to be small is supplied to the selector 929, and when e(x) is large, a signal which causes the local means width to be large is supplied to the selector 929. An output of the selector 929 is multiplied by "a" ($0 \leq a \leq 1$ and in this example, "a" is set to 0.5) by a multiplier 928 and is then subtracted from an output $y(x_0)$ of the delay circuit 913 in a subtracter 930. The result of subtraction is supplied as y'(x)=log Y' to the DGC 10. A sequence of operations of the filter is expressed by the following equation (3) with the local average width set to correspond to w pixels.

$$y'(x) = y(x) - a \cdot (1/w) \sum_{i=x-w/2}^{x+w/2} y(i) \tag{3}$$

That is, an average value subtraction type filter for subtracting the average value of pixels lying in the range of the local average width on both sides of the pixel value y(x) from the pixel value y(x) is constructed.

The coefficient a to be multiplied by the local average value determines the degree of the effect of the filter. The equation (3) can be expressed by the following equation (4) by using the convolution operation with respect to the rect function.

$$y'(x) = y(x) - (a/w)rect(x/w) * y(x) \tag{4}$$
$$= y(x) * \{\delta(x) - (a/w)rect(x/w)\}$$

Figure 3:
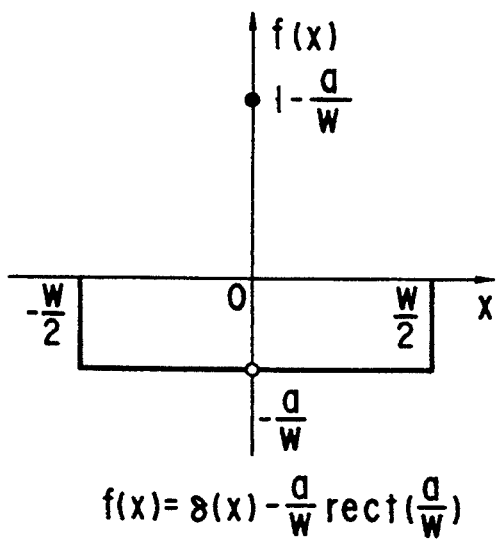
FIG. 3 is a diagram showing the relation between the coordinate position of a pixel in the horizontal direction and a coefficient of the convolution operation.

FIG. 3 indicates $\delta(x) - (a/w)rect(x/w)$.

Further, the following equation (5) can be obtained by subjecting the equation (4) to the Fourier transform.

$$y'f(u) = yf(u) \{1 - a \cdot sinc(wu)\} \tag{5}$$

Figure 4:
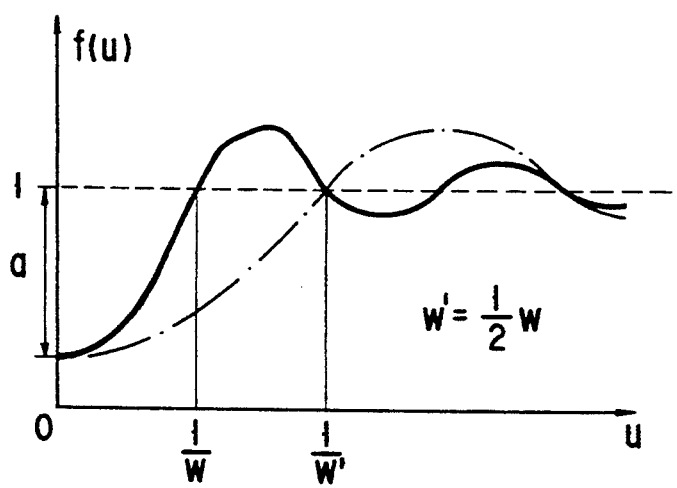
FIG. 4 is a diagram showing the characteristic of the filter.

FIG. 4 indicates [1−a·sinc(wu)]. In FIG. 4, u denotes a space frequency.

It is understood that the characteristic shown in FIG. 4 is the characteristic of the filter, that is, the characteristic for suppressing the low frequency range in which nonuniformity of illumination occurs. The degree of suppression becomes stronger as the coefficient a becomes larger.

Further, the frequency range to be suppressed can be extended to a higher frequency range by setting the local average width w to a smaller value, for example, by setting w'=w/2.

variation in the characteristic of the filter due to variation in w is shown in FIG. 5. In FIG. 5, a=1 and the abscissa indicates a frequency which is normalized with the Nyquist frequency set at 1.0.

As shown in FIG. 5, when w becomes smaller, the intermediate frequency range of the normalized space frequency is also suppressed. The frequency components constructing the feature of the image often lie in or near the intermediate frequency range of the normalized space frequency. Further, the nonuniformity of illuminance caused by lighting the entire portion of the object, that is, nonuniformity of illumination, often occurs in the low frequency range of the space frequency. Therefore, in order to suppress the nonuniformity of illumination, it is effective to set w to a large value and suppress only the low frequency component.

However, when an edge occurs in the image, the edge is excessively emphasized and the image becomes unnatural if only the low frequency component is suppressed.

Figure 10:
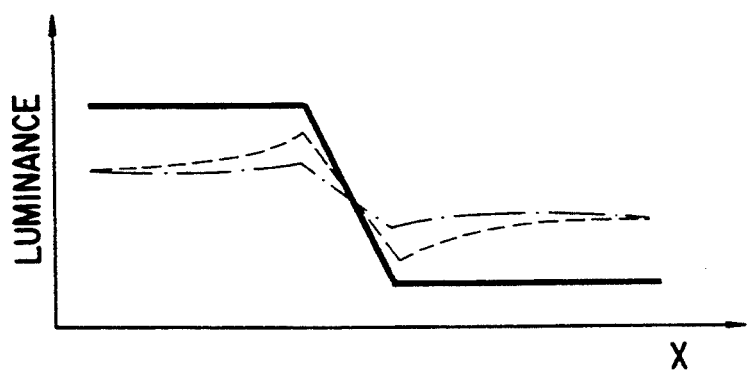
FIG. 10 is a diagram showing an image signal prior to the filtering process superposed on an image signal after the filtering process.

FIG. 10 shows an image signal before the filtering process superposed on an image signal after the filtering process. In FIG. 10, a solid line indicates a signal before the filtering process and an edge at which a bright portion is changed to a dark portion in a direction from the right to the left is present. Broken lines indicate a waveform obtained after the filtering operation is effected with the local average width w set at 9, and an overshoot and an undershoot can be observed in regions between the edge portion and portions in which no variation in the luminance occurs. A one-dot-dash line indicates a waveform obtained after the filtering operation is effected with the local average width w set at 3, and in this case, it is understood that the overshoot and undershoot can be suppressed in comparison with a case wherein w is set at 9 and the filtering operation is effected without disturbing the original waveform.

Thus, the nonuniformity of illumination can be effectively suppressed without excessively emphasizing the edge by setting w to a large value where no edge lies so as to hold the frequency components of the image and suppress only the low frequency range caused by the non-uniform lighting and setting w to a small value in position near the edge.

As described above, when a large edge is present, the edge detection circuit $9a_1$, characteristic selection circuit $9b_1$ and selector circuit 929 are operated to select a filter having a small local average width so as to suppress the frequency components up to the high frequency range, thereby reducing the influence on the edge portion. When no edge is present, a filter having a large local average width is selected to suppress only the low frequency range. In this embodiment, the maximum value of the local average with w is set to 9 and the four variable values of w are provided, but the maximum value can be set to a larger value and the number of variable values of w can be set to a larger value.

The equation (3) can be rewritten into the following equation (6).

$$y'(x) = y(x) - a \cdot (1/w) \sum_{i=x-w}^{x+w} y(i)k(i + x) \tag{6}$$

where k(x)=rect(x/w).

k(i) is shown in FIG. 13. If the spline function or sinc function which is not shown is used as k(i), a ripple component observed in the frequency component of the filter shown in FIG. 5 can be suppressed.

In an image signal filtered as described above, the zero frequency is varied as is clearly seen from FIG. 4 and the gain is adjusted to a value suitable for the monitor display by the DGC 10.

The color signals R, G and B separated by the video processor 7 shown in FIG. 1 and converted into corresponding analog signals by the D/A converters $17_r$, $17_g$ and $17_b$ are converted into corresponding logarithm values by analog amplifiers $13_r$, $13_g$ and $13_b$, delayed by time corresponding to time required for creating the compression coefficient by delay circuits $14_r$, $14_g$ and $14_b$ and then added to the compression coefficient in adders $15_r$, $15_g$ and $15_b$. The above operation is equivalent to calculation of the following equation (7) when an R signal is taken as an example.

$$logR + log(\beta Y^\alpha/Y) = log(R \cdot \beta Y^\alpha/Y) \qquad (7)$$

Since the signal is further subjected to the inverse logarithmic conversion by inverse logarithmic amplifiers $16_r$, $16_g$ and $16_b$, the signal is converted into $R \cdot \beta Y^{-\alpha}/Y$ (for the R signal) and the color signal is thus multiplied by the compression coefficient $\beta y^{\prime \alpha}/Y$.

Thus, the dynamic range is compressed and the image is displayed on the monitor.

As described above, a filter for suppressing the frequency components up to the higher frequency range is selected for the edge portion of the image signal according to the size thereof by a sequence of operations of the adaptive filter 9 so that the nonuniformity of illumination can be eliminated without forcedly or excessively emphasizing the edge portion and the compression factor of the dynamic range by the DGC 10 can be lowered so as to permit a good image of sufficient contrast to be displayed.

Figure 6:
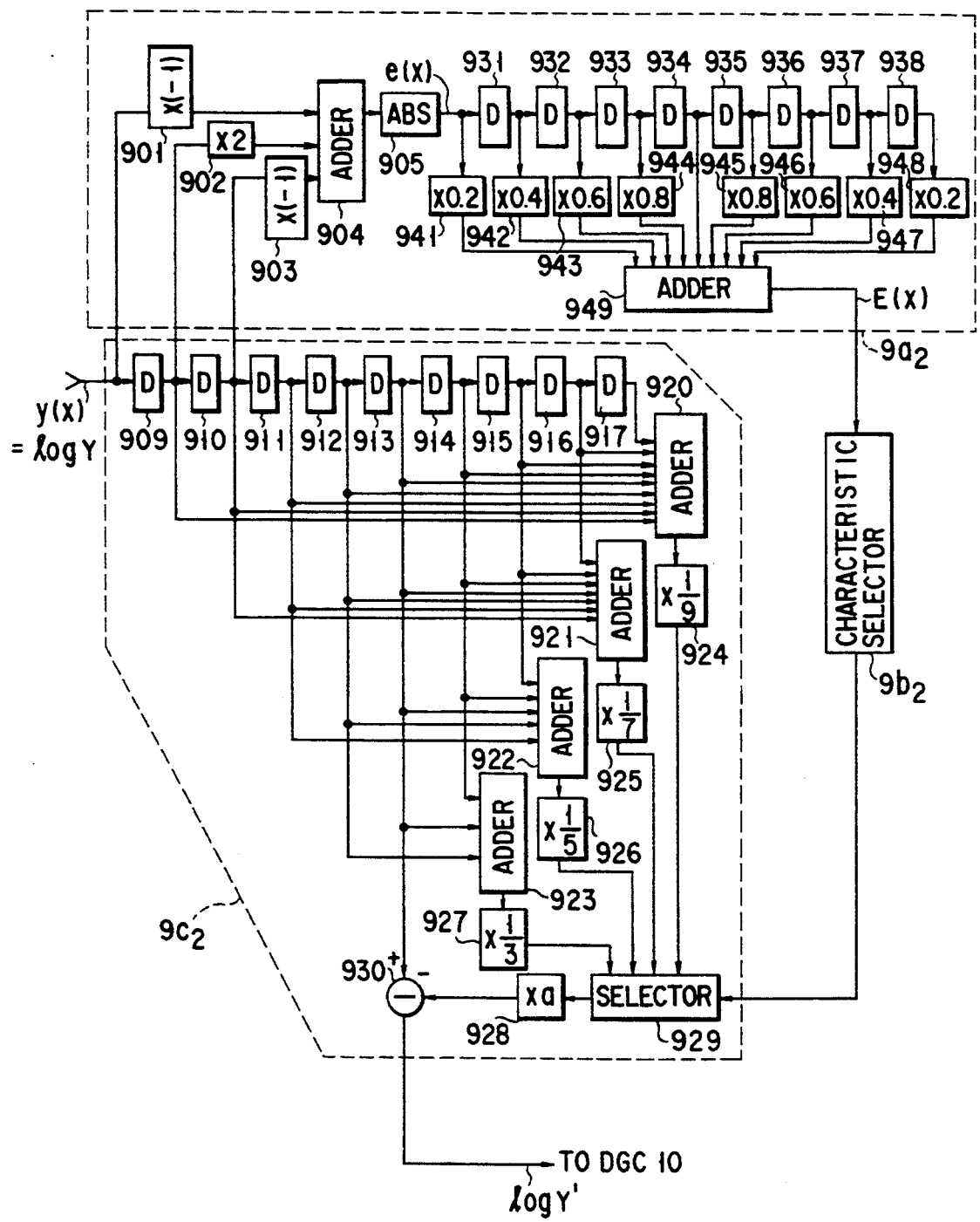
FIG. 6 is a diagram showing a second embodiment of this invention in which an edge detection circuit is modified.

Next, a second embodiment in which the construction of the edge detection circuit 9a of the adaptive filter 9 in the first embodiment is modified is explained with reference to FIG. 6.

Like the first embodiment, in this embodiment, an edge signal e(x) is derived via multipliers 901, 902 and 903, adder 904 and absolute value circuit 905. The signal indicates the magnitude of a difference between the adjacent pixels, that is, the size of the edge. The edge signal e(x) is delayed by one pixel in each of delay circuits 931 to 938. The central weight sum of nine edge signals e(x) of $e(x_0-4)$, - - -, $e(x_0)$, - - -, $e(x_0+4)$ corresponding to the edge signal $e(x_0)$ output from a delay circuit 934 which is set at the center and four pixels lying in each position before and after the edge signal $e(x_0)$ is derived by means of multipliers 941 to 948 and an adder 949 and the central weight sum is output as an edge information signal E(x) to a characteristic selection circuit 9b. When the edge information detection width is S, E(x) can be expressed by the following equation (8).

$$E(x) = \sum_{i=-s/2}^{S/2} e(x+1) \cdot C(i) \qquad (8)$$

In this case, C(i) is a function as shown in FIG. 7 in which the weighting coefficient becomes smaller with an increase in the distance from the center. In this embodiment, when a large edge is present in a position $x_1$ within the range of edge information detection width S with respect to the position x of a pixel in which S is set to 9, the edge signal $e(x_1)$ becomes large. According to the equation (3), since the weighting coefficient is set to a large value when x is near $x_1$, E(x) becomes large, and since the weighting coefficient is set to a small value when x is set far from $x_1$ within the range of detection width S, E(x) becomes small. That is, the edge information signal E(x) also contains information relating to the distance from the edge.

Figures 14, 15:
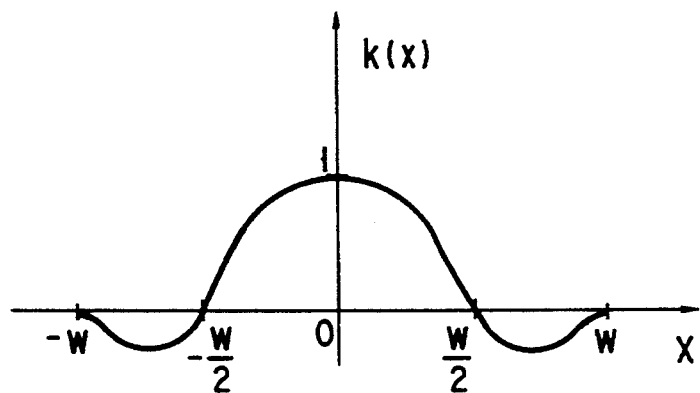
FIG. 14 is a diagram showing an example of a spline function.
FIG. 15 is a diagram showing the relation between the magnitude of an edge information signal and the local average width.

In the characteristic selection circuit $9b_2$, a signal is supplied to the selector 929 of the filter $9c_2$ to select an optimum local average width according to the magnitude of the edge information signal E(x). The relation between the magnitude of E(x) and the local average width is shown in FIG. 15 when E(x) is large, the local average width is set to a small value, and when E(x) is small, the local average with is set to a large value.

Thus, the nonuniformity of illumination for the entire portion of the image can be suppressed and a good image can be obtained without forcedly emphasizing a portion near the edge by effecting a sequence of the above operations.

According to this embodiment, since the local average width of the filter continuously becomes smaller as the distance to the edge becomes smaller, an image which can be more naturally observed can be obtained.

In this embodiment, the edge detection width S is set to 9, but it can be set to a larger value or smaller value. Further, the coefficient of the weighting sum varies linearly, but the coefficient may be adequately changed.

Further, the edge information signal E(x) may be normalized by use of an average value of the image.

Next, a third embodiment in which the construction of the filter 9c in FIG. 1 is simplified is explained with reference to FIG. 8.

Figure 8:
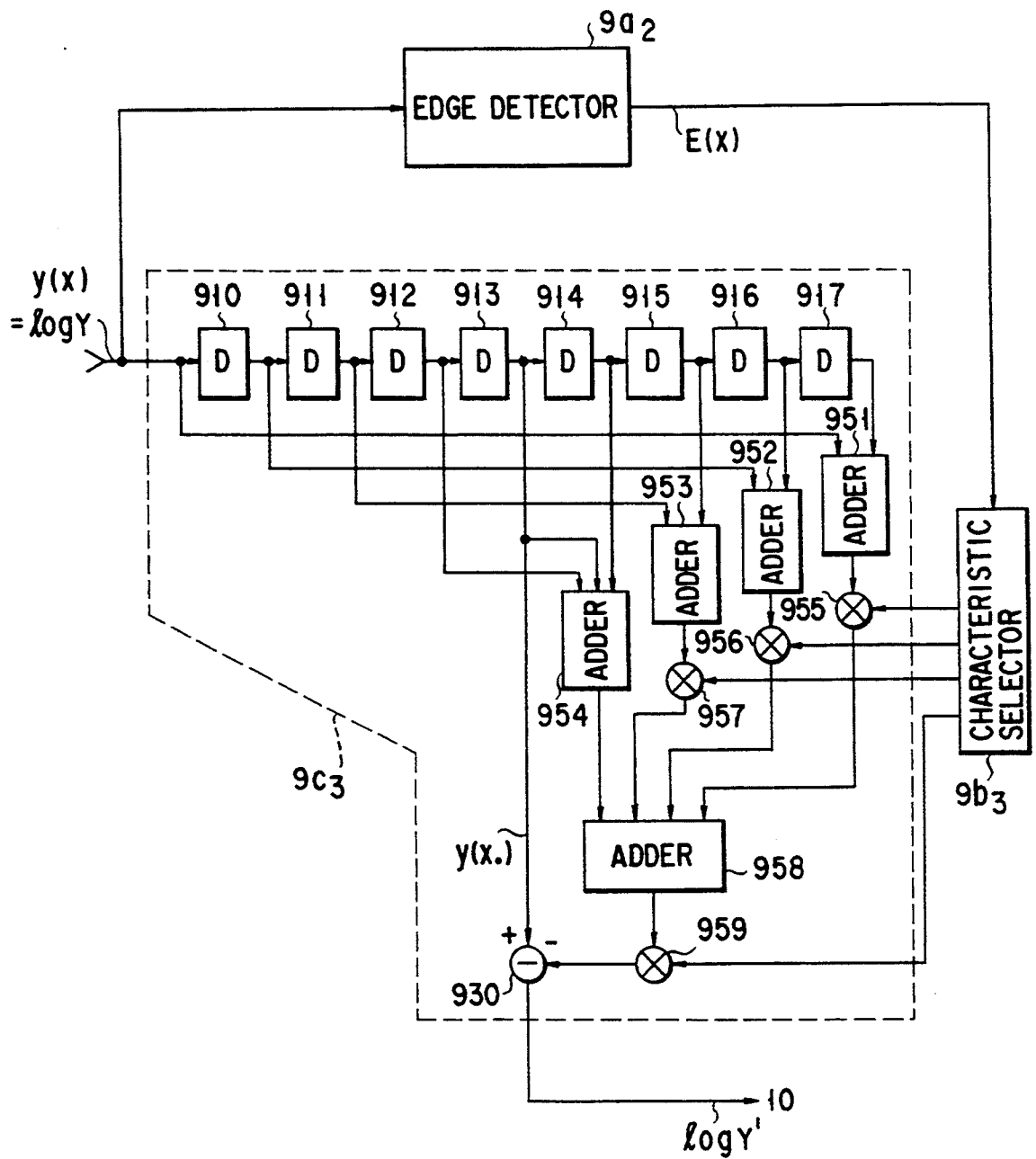
FIG. 8 is a diagram showing a third embodiment of this invention in which the construction of the filter is simplified.

In FIG. 8, 9a 2 denotes an edge detection circuit which has the same construction as that described in the second embodiment. A portion $9c_3$ surrounded by broken lines corresponds to the filter 9c shown in FIG. 1. An edge signal e(x) is derived based on an input signal y(x) in the edge detection circuit $9a_2$ in the same manner as described in the second embodiment.

In the filter $9c_3$, a signal is delayed by one pixel in each of delay circuits 910 to 917. When a signal output from the delay circuit 913 is used as a central pixel $y(x_0)$, signals of three pixels including the central pixel $y(x_0)$ and signals $y(x_0-1)$ and $y(x_0+1)$ output from the delay circuits 912 and 914 and lying before and after the central pixel $y(x_0)$ are added together in an adder 954 and then supplied to an adder 958. Signals $y(x_0-2)$ and $y(x_0+2)$ output from the delay circuits 911 and 915 are added together by an adder 953, multiplied by a value output from a characteristic selection circuit $9b_3$ by a multiplier 957 and then supplied to the adder 958. Signals $y(x_0-3)$ and $y(x_0+3)$ output from the delay circuits 910 and 916 are added together by an adder 952, multiplied by a value output from the characteristic selection circuit $9b_3$ by a multiplier 956 and then supplied to the adder 958. A signal $y(x_0-4)$ input to the delay circuit 910 and a signal $y(x_0+4)$ output from the delay circuit 917 are added together by an adder 951, multiplied by a value output from the characteristic selection circuit $9b_3$ by a multiplier 955 and then supplied to the adder 958. In the adder 958, the four inputs are added together and then supplied to a multiplier 959 which in turn multiplies the sum by a value output from the characteristic selection circuit $9b_3$ and supplies the result of multiplication to a subtracter 930. In the subtracter 930, a value which is output from the multiplier 959 and which is a local average value is subtracted from an output $y(x_0)$ from the delay circuit 913.

The above characteristic selection circuit $9b_3$ outputs signals as shown in FIG. 16 according to the magnitude of the edge information signal E(x) from the edge detection circuit $9a_2$. In FIG. 16, a is is a coefficient lying in the range of $0 \leq a = 1$ and can be used to adjust the effect of the filter.

As described above, the entire nonuniformity of illumination can be effectively eliminated and a good image can be obtained without causing a bad influence in a position near the edge portion by use of a simple construction formed of a combination of the edge detection circuit 9a, characteristic selection circuit 9b₃ and filter 9c₃.

Next, a fourth embodiment in which an edge information signal E(x) and an edge direction signal ed(x) indicating the direction of an edge (from a bright portion to a dark portion or from a dark portion to a bright portion) are used as an input to the characteristic selection circuit.

FIG. 9 shows the construction of the fourth embodiment of this invention. A filter $9c_3$ has the same construction as the filter $9c_3$ of the third embodiment shown in FIG. 8. An edge detection circuit $9a_4$ is so constructed that an edge direction signal ed(x) can be generated as an output of the adder 904 of the edge detection circuit $9a_2$ in the second embodiment of FIG. 6. ed(x) is positive when the luminance of the edge portion varies from the bright level to the dark level and is negative when the luminance of the edge portion varies from the dark level to the bright level. The signal ed(x) is delayed by a period of four pixels by means of a delay circuit 960 in order to transmit information of the same pixel as that of E(x) and is then supplied to a characteristic selection circuit $9b_4$ together with E(x).

In the characteristic selection circuit $9b_4$, the value of a is changed in a range of 0.3 to 0.7 such that it becomes large when the edge direction signal ed(x) is positive and small when the edge direction signal ed(x) is negative as shown in FIG. 17. A value shown in FIG. 16 is output for the input edge information signal E(x) so as to determine the characteristic of the filter.

Figure 11:
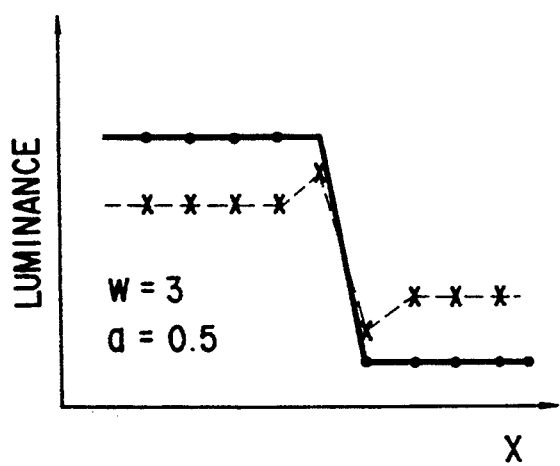
FIG. 11 is a diagram showing the waveforms obtained before and after the filtering process when w=3.

FIG. 11 shows waveforms obtained before and after the filtering operation when w=3. A solid line indicates the waveform obtained before the filtering operation and broken lines indicate the waveform obtained after the filtering operation. Plots on the lines each represent one pixel. Even when w=3 is selected in a portion near the edge by the edge information signal E(x), a large overshoot and undershoot occurs in the waveform after the filtering operation if the edge becomes steep as shown in the drawing. A case wherein the coefficient a of the filter is adaptively changed by use of the edge direction signal ed(x) at the filtering time as in this embodiment is shown in FIG. 12. In FIG. 12, the edge direction signal ed(x) in the pixel of o indicates a large positive value and a=0.65 is selected. Further, ed(x) in the pixel of Δ becomes negative, a=0.4 is selected, and the filtering operation can be effected while the overshoot and undershoot are suppressed as shown by the broken lines.

Next, a fifth embodiment of this invention constructed by use of a digital circuit is explained.

FIG. 18 is a block diagram of this embodiment. The construction of a circuit section connected to the preceding stage of the video processor is the same as that shown in FIG. 1. The luminance signal Y output from the video processor 7 is processed by a logarithmic circuit 8, adaptive filter circuit 9 and dynamic range/gain controller 10 so as to eliminate the nonuniformity of illumination and compress the luminance. 20 denotes a subtracter, 21 denotes an inverse logarithmic circuit from which a coefficient multiplied by the signals R, G and B is output. 22r, 22g and 22b denote multipliers for multiplying a coefficient for compression.

The adaptive filter circuit 9 includes a band setting circuit 23 and band variable low-pass filtering circuit (LPF) 24 for detecting nonuniformity of illumination, a mean square value detection circuit 25 for creating a coefficient n to be multiplied by the output of the LPF circuit 24, a coefficient setting circuit 26, a multiplier 27, and a subtracter 28 for subtracting the detected nonuniformity of illumination.

The construction of the band setting circuit 23 and band variable LPF circuit 24 is shown in FIG. 19. That is, the band setting circuit 23 includes an edge detection circuit 9a for detecting the edge signal of the signal log Y and a characteristic selection circuit 9b. The edge detection circuit 9a includes a Laplacian circuit 29 for effecting the 2-dimensional Laplacian operation, an absolute value detection circuit 30 and a low-pass filter circuit 31 for subjecting an edge signal e(x) output from the absolute value detection circuit 30 to the 2-dimensional low-pass filtering process and outputting an edge information signal E(x). The characteristic selection circuit 9b derives w which is a coefficient for determining the band in the band variable LPF from the edge information signal E(x) and outputs W based on the characteristic shown in FIG. 20. The band variable LPF 24 includes a Gaussian coefficient selection circuit 32 and a convolution circuit 33. The Gaussian coefficient selection circuit selects a coefficient expressed by the following equation (9) according to W output from the characteristic selection circuit (refer to FIG. 21).

$$K(x) = Ae^{-c\left(\frac{2x}{W}\right)^2} \tag{9}$$

where c is an adequate coefficient and A can be derived based on the following equation (10).

$$A = 1 / \sum_{x=-\frac{W}{2}}^{\frac{W}{2}} e^{-c\left(\frac{2x}{W}\right)^2} \tag{10}$$

The above equation is expressed in the one-dimensional form, but is actually a 2-dimensional equation. A is a coefficient for adjusting variation in the luminance level caused by a difference in W and is set to make the total sum of coefficient values of the Gaussian coefficients equal to "1".

Since the band setting circuit selects W of small value when a large number of edges are present or when the distance to an edge is large, the low-pass effect of the band variable LPF becomes small. Further, since the band setting circuit selects W of large value when a less number of edges are present or when the distance to an edge is small, the low-pass effect of the band variable LPF becomes large.

In the mean square value detection circuit 25 and coefficient setting circuit 26, a coefficient n (n≦1) by which a signal subjected to the low-pass filtering process by the band variable LPF is multiplied is derived. The coefficient n is so set as to make the mean square value of an output log Y' of the adaptive filter circuit 9 equal to the value $R_{power}$ input to the coefficient setting circuit 26.

By multiplying the above coefficient, the mean square value of the log Y' or the power is made constant. That is, the coefficient n for an object having large nonuniformity of illumination is set to a large value so that the nonuniformity of illumination may be strongly suppressed, and the coefficient n for an object having small nonuniformity of illumination is set to a small value so that the nonuniformity of illumination may be weakly suppressed. The function of the adaptive filter may be expressed by the following equation (11) and the band characteristic is shown in FIG. 22.

$$\log Y' = \log Y - n \cdot (\log Y) * \left( A \cdot e^{-c\left(\frac{2x}{W}\right)^2} \right) \quad (11)$$

when * represents a convolution operation.

That is, when the edge amount is small, W becomes large and only the low frequency component corresponding to the nonuniformity of illumination is suppressed. When the edge amount is large, W becomes small and the intermediate frequency component is also suppressed. Further, n is changed according to the absolute magnitude of the nonuniformity of illumination and the adaptive filtering operation is effected to make the power of log Y' constant. In this case, since a Gaussian filter is used as the band variable filter, variation in the filter characteristic is monotonous, ripples as shown in FIG. 5 will not occur and there is no possibility that artifacts or the like occur in the filtering image.

The dynamic range controller 10 includes a coefficient setting circuit 35 for setting an addition coefficient log β based on an average value ave supplied from the average value detector 34 and a set value $R_{ave}$, a standard deviation detector 36, a coefficient setting circuit 37 for setting a multiplying coefficient a based on the standard deviation SD and set value $R_{SD}$, a multiplier 38, and an adder 39. The coefficient setting circuits 35 and 37 generate coefficients to make the average value of the output signal of the DGC 10 and the standard deviation equal to $R_{ave}$ and $R_{SD}$.

Next, the operation of this embodiment is explained. A digital signal accumulatively added and input is separated into a luminance signal Y, and signals R, G and B by means of the video processor 7. In this case, assume that the dynamic range of the luminance signal Y is 75 dB. In the adaptive filter 9, the edge amount is detected as described before and the adaptive filtering operation is effected according to the detected edge amount to output a signal log Y'. The value $R_{power}$ of log Y' is set so as to suppress the dynamic range thereof to approx. 50 to 60 dB. The output log Y' is input to the DGC circuit 10, the gain and the dynamic range to be suppressed to 45 to 50 dB which is the dynamic range of the monitor according to the previously set $R_{ave}$ and $R_{SD}$ are adjusted and a signal Y" expressed by the following equation (12) is output.

$$Y'' = a \cdot \log Y' + \log \beta \quad (12)$$

A coefficient ($=Y'^a \cdot \beta/Y$) multiplied by use of the multipliers 22r, 22g and 22b is output via the subtracter and inverse logarithmic circuit 21. A calculated value indicated by the following expression (13) is output for the R signal, for example.

$$R \times \frac{Y'^a \cdot \beta}{Y} \quad (13)$$

Thus, a signal whose dynamic range is compressed is displayed on the monitor.

As described above, the nonuniformity of illumination is suppressed by the adaptive filter 9, the dynamic range of the DGC 10 is compressed, and an original image having a wide dynamic range can be displayed as a preferable image having a sufficient contrast on the monitor.

Figure 23:
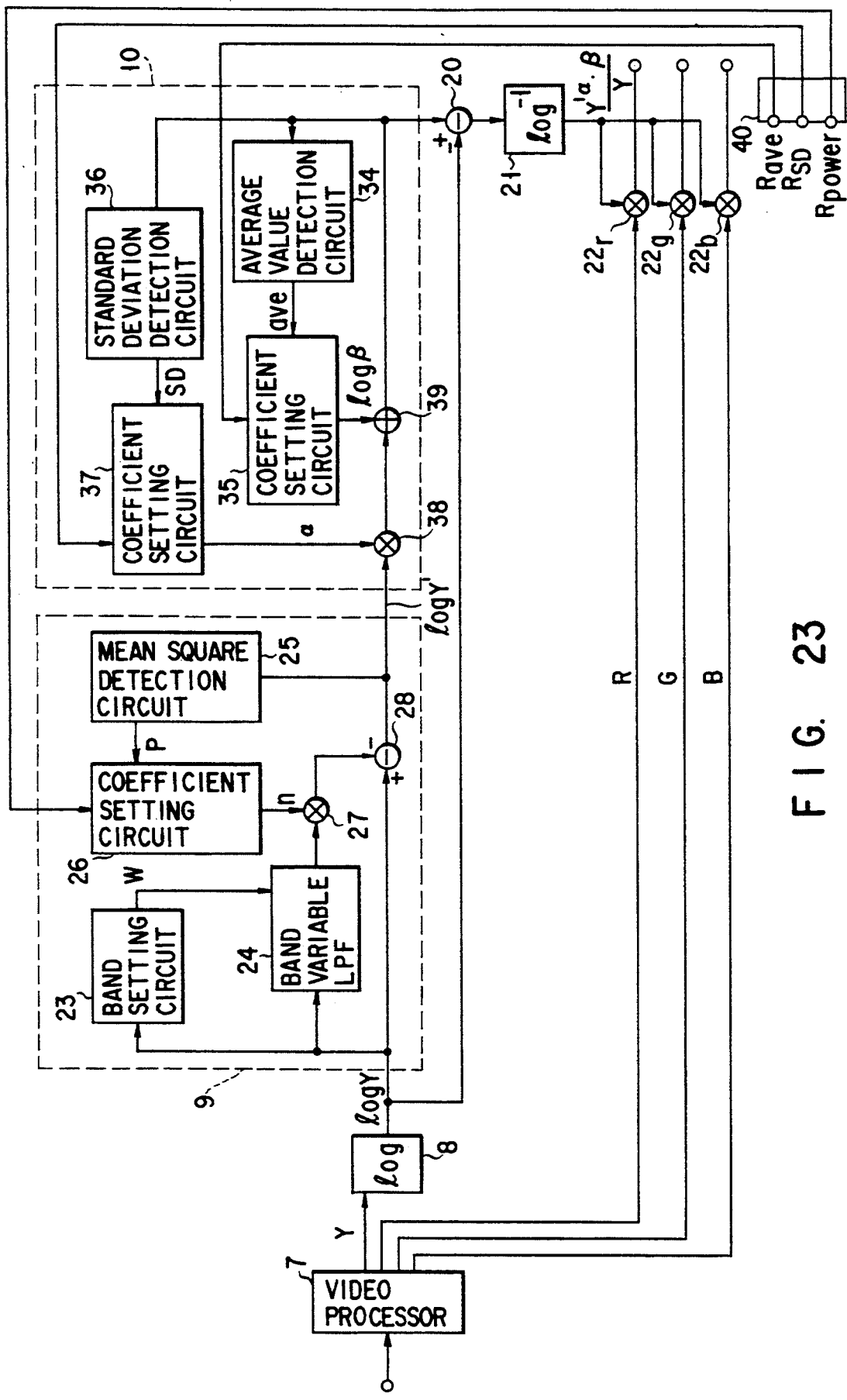
FIG. 23 is a diagram showing a circuit construction using a controller for controlling three parameters $R_{power}$, $R_{ave}$ and $R_{SD}$ from the exterior.

Further, since the degree of suppression of the nonuniformity of illumination can be adjusted by use of $R_{power}$ and the compression factor of the DGC can be adjusted by use of $R_{ave}$ and $R_{SD}$, a preferable image for each person can be displayed by use of a controller 40 for controlling the three parameters $R_{power}$, $R_{ave}$ and $R_{SD}$ from the exterior as shown in FIG. 23.

Figure 24:
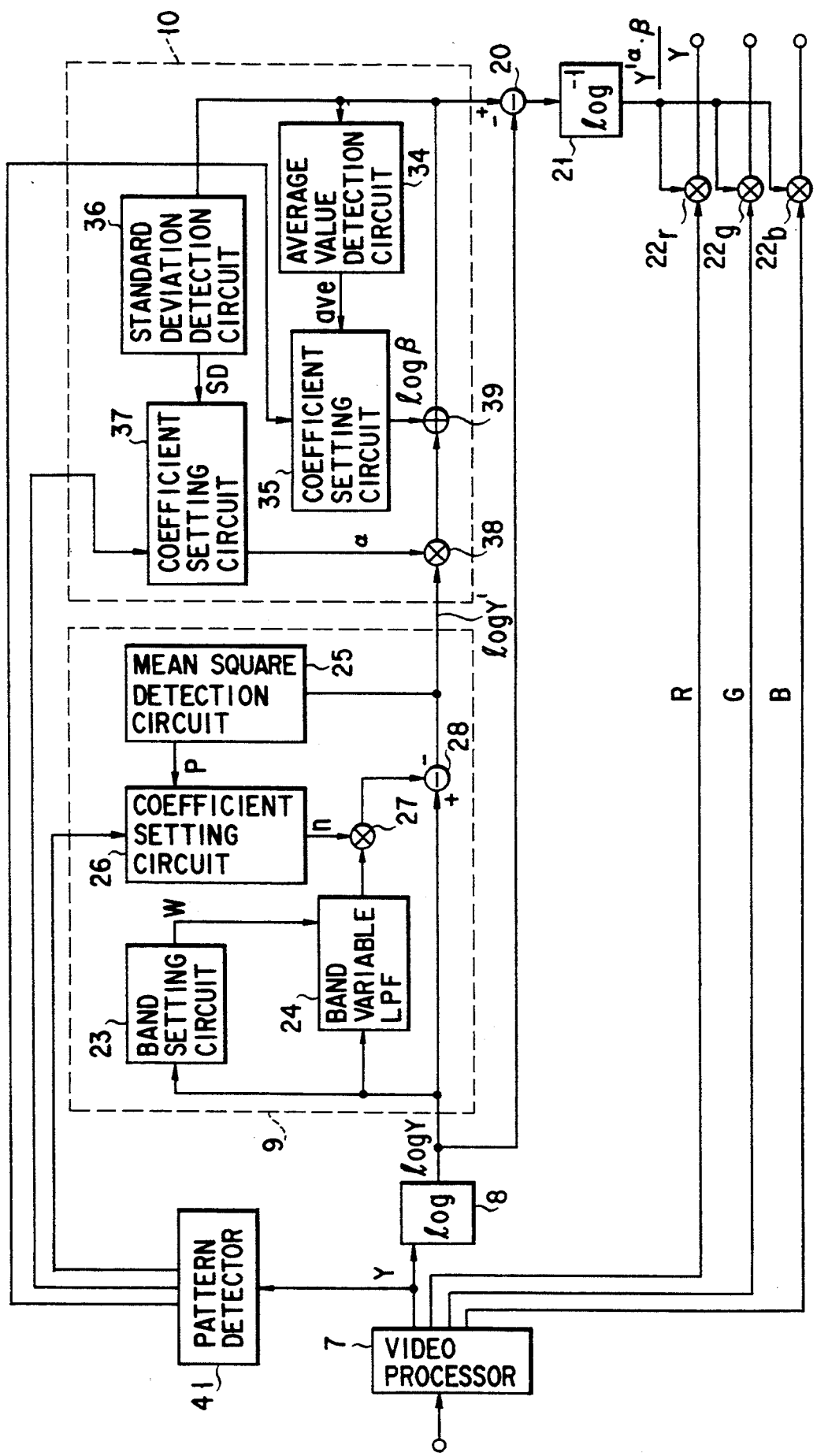
FIG. 24 is a diagram showing a circuit construction using a pattern detector.

By using a pattern detector 41 for adaptively controlling $R_{power}$, $R_{ave}$ and $R_{SD}$ according to the pattern and type of an object as shown in FIG. 24, any object can be displayed in good condition. The pattern detection may be effected by the intelligent process using a neural network, for example.

In this embodiment, since the Gaussian filter is used as the band variable LPF, a preferable image which can be filtered according to a filter characteristic causing no ripple on the frequency surface can be obtained.

In this embodiment, the characteristic value of the Gaussian coefficient is selected from the edge information signal E(x) according to the characteristic shown in FIG. 20, the characteristic may be changed in accordance with the histogram of the edge information signal or the like.

Next, a sixth embodiment of this invention in which the construction is more simplified is explained.

Figure 25:
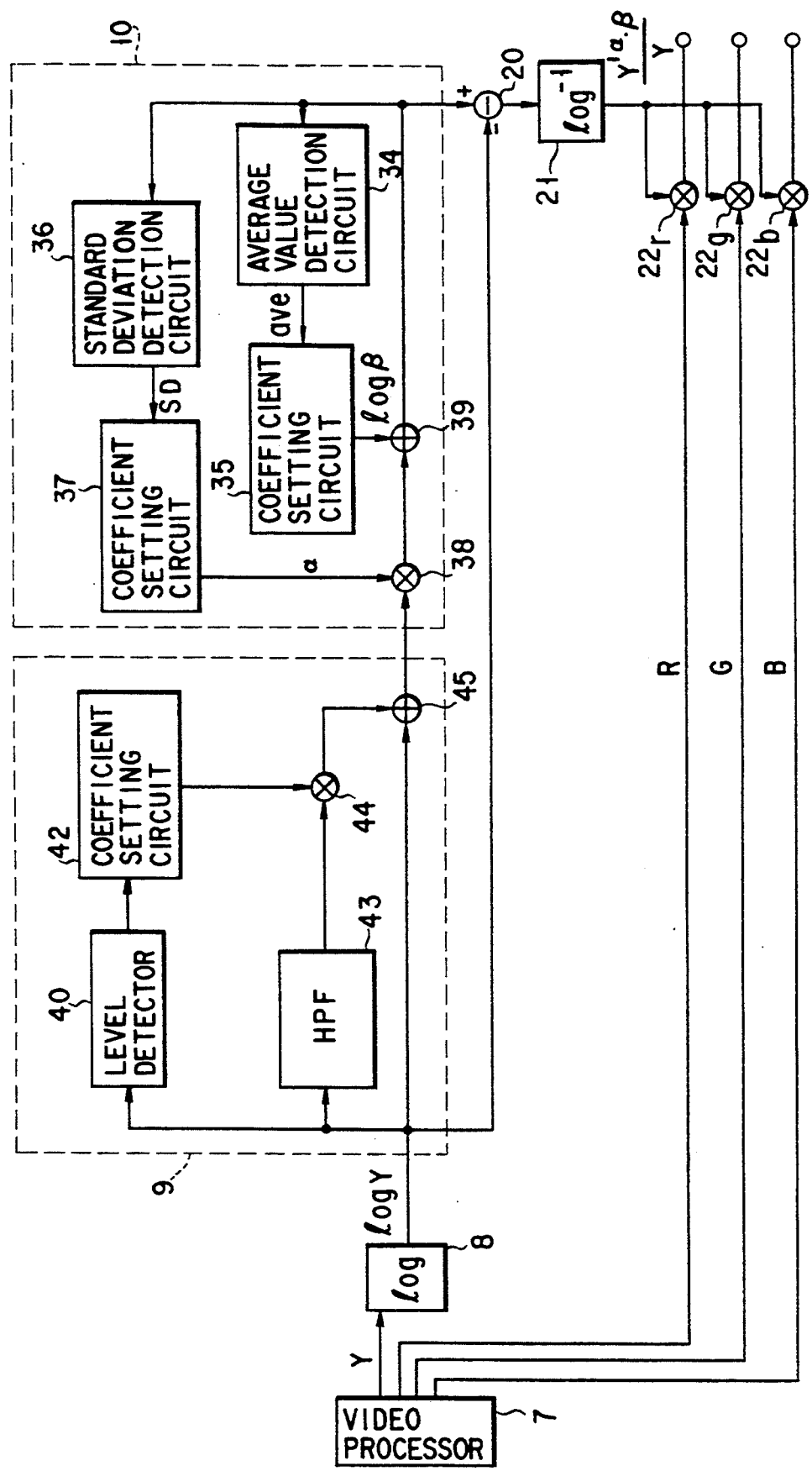
FIG. 25 is a diagram showing the circuit construction of a sixth embodiment of this invention.

FIG. 25 shows the construction of this embodiment. A luminance signal Y output from a video processor 7 is processed by a logarithmic amplifier 8, adaptive filter circuit 9 and dynamic range/gain controller 10 so as to eliminate the nonuniformity of illumination and compress the luminance. 20 denotes a subtracter and 21 denotes an inverse logarithmic circuit from which a coefficient multiplied by the signals R, G and B is output. 22r, 22g and 22b denote multipliers for multiplying a coefficient for compression.

The adaptive filter 9 includes a level detection circuit 40 for detecting an average level of values of pixels near a target pixel, a high-pass filter (HPF) 43 for extracting the high frequency component of a pixel, a coefficient setting circuit 42 for setting a coefficient to be multiplied by an output of the HPF 43 according to an output of the level detection circuit 40, a multiplier 44 for multiplying an output of the coefficient setting circuit 42 by an output of the HPF 43, and an adder 45 for adding the output of the multiplier 44 to the output log Y of the logarithmic circuit 8.

The level detection circuit 40 is a convolution filter which subjects the output log Y of the logarithmic amplifier 8 to the convolution operation by using a coefficient of 3×3 as shown in FIG. 26, for example.

The HPF 43 can be realized by a convolution filter using a coefficient of 3×3 as shown in FIG. 27.

The output log Y from the logarithmic amplifier 8 is supplied to the level detection circuit 40 in which the average level of pixels near the target pixel is detected and a coefficient for the pixel is determined by the coefficient setting circuit 42 according to the output of the level detection circuit. The coefficient setting circuit 42 outputs a large value for a pixel having a high average level and outputs a small value for a pixel having a low average level.

The high frequency component of log Y output from the HPF 43 is multiplied by a coefficient output from the coefficient setting circuit 42 by the multiplier 44 and the Output of the multiplier 44 is added to the output log Y of the logarithmic amplifier 8 by means of the adder 45.

The output of the adder 45 is supplied to the DGC 10 and the dynamic range thereof is controlled by the coefficients $\alpha$ and log $\beta$. In this case, the dynamic range for the luminance signal Y is controlled according to the input/output characteristic of $\beta \cdot Y^\alpha$. FIG. 28 shows the input/output characteristic of high frequency obtained when the dynamic range is compressed. When the dynamic range is compressed, the compression factor for the high luminance level is larger than that for the low luminance level as shown in FIG. 28 and the contrast in the high luminance level is lowered. However, since the high frequency component of the high luminance level is previously emphasized in the adaptive filter circuit 9, a preferable image can be displayed on the monitor without lowering the contrast when the dynamic range is compressed. Further, since the window width of the convolution filter used is as small as 3×3, the influence by the overshoot and undershoot near the edge can be suppressed.

In order to simplify the circuit construction, the level detection circuit 40 of FIG. 25 may be omitted and an output of the logarithmic amplifier 8 may be directly supplied to the coefficient setting circuit 42 as shown in FIG. 29.

According to this embodiment, the same effect as that obtained by suppression of the nonuniformity of illumination can be attained without causing degradation in the contrast of an image obtained after compression of the dynamic range by emphasizing the high frequency component of the high luminance level before the dynamic range is compressed, and the device can be made simple in construction and at a low cost even when the adaptive filter circuit 9 is constructed by a 2-dimensional filter.

Next, a seventh embodiment of this invention in which a coefficient used for emphasizing the high frequency component is adaptively set is explained.

Figure 30:
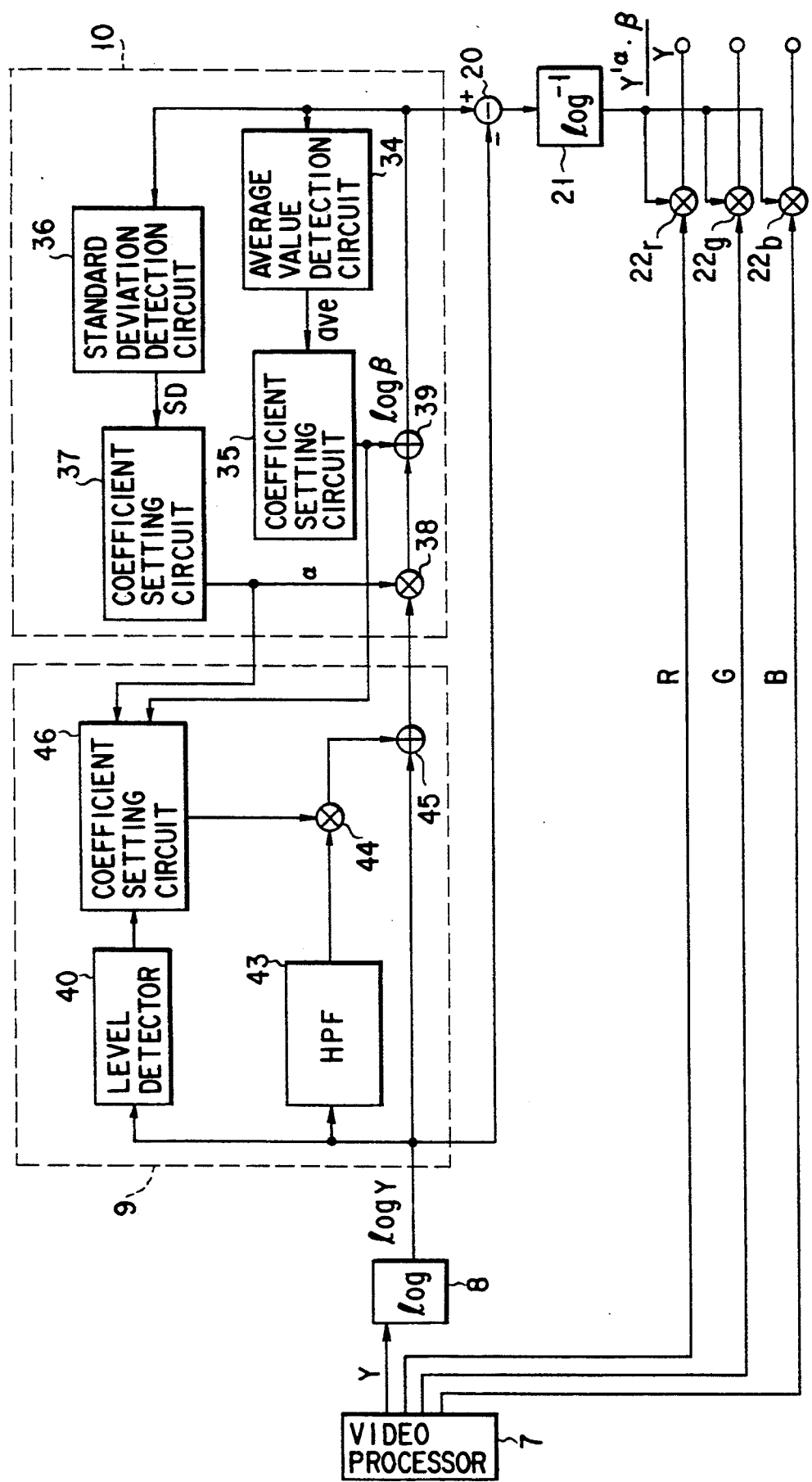
FIG. 30 is a diagram showing the circuit construction of a seventh embodiment of this invention.

FIG. 30 shows the construction of this embodiment. An adaptive filter 9 of this embodiment includes a level detection circuit 40, adaptive coefficient setting circuit 46, HPF 43, multiplier 44 and adder 45. The above elements except the adaptive coefficient setting circuit 46 are the same as those of the embodiment shown in FIG. 25 and the explanation therefor is omitted.

The adaptive coefficient setting circuit 46 converts the average level which is an output of the level detection circuit 40 into a weighting coefficient used for emphasis of the high frequency components. In this case, the conversion table is changed by use of the coefficients $\alpha$ and log $\beta$ obtained in the DGC 10.

Figure 31:
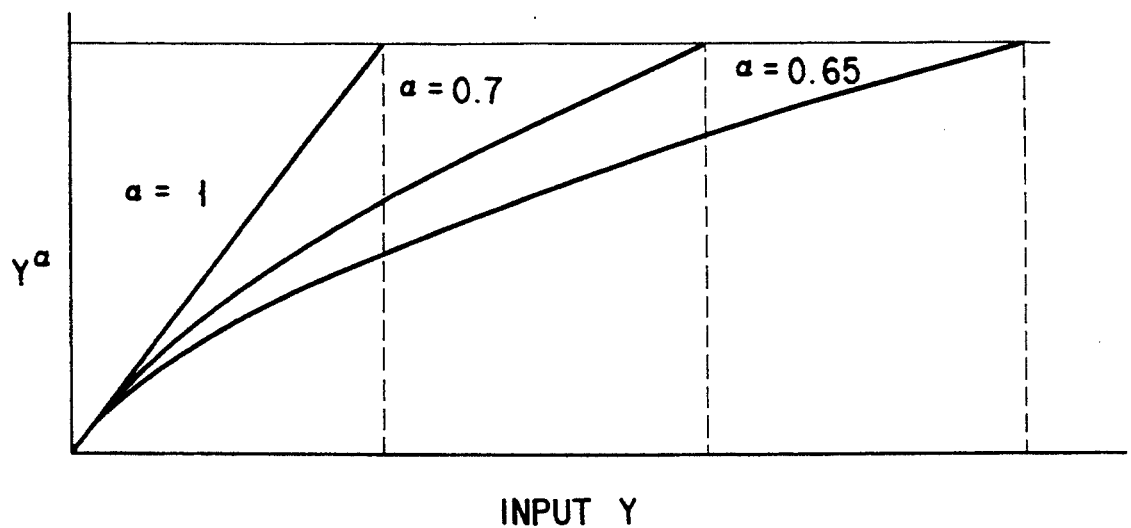
FIG. 31 is a diagram showing the input/output characteristic obtained when the coefficient $\alpha$ is changed.

FIG. 31 shows the input/output characteristic obtained when $\alpha$ is changed.

As shown in FIG. 31, since the high frequency component of an input signal having a high average level is compressed with a compression factor larger than that used for compressing the high frequency component of the input signal having a low average level when $\alpha$ is smaller than 1, the adaptive coefficient setting circuit 46 selects a conversion table so as to output a coefficient of large value when an output of the level detection circuit 40 is large and a coefficient of small value when the output of the level detection circuit 40 is small.

However, when $\alpha$ is set to a value approximately equal to 1, substantially no difference occurs between the compression factor used for compression of the high frequency component of high average level and the compression factor used for compression of the high frequency component of low average level. In this case, the same value is output irrespective of the magnitude of an output of the level detection circuit 40.

As the above coefficient, $k/f'(Y)$ obtained by multiplying an adequate constant k by $1/f'(Y)$ which is a reciprocal of the differential coefficient of $f(Y)=\beta \cdot Y^\alpha$ can be used, for example.

According to this invention, since the high frequency components are emphasized to substantially the same degree in a range from the low luminance region to the high luminance region even if the coefficient used for compression of the dynamic range is changed, a good image of sufficient contrast can be obtained.

In the above embodiment, the filtering characteristic is changed according to the position of each pixel in one image based on the feature of the image signal of the image, but it is also possible to change the filtering characteristic for image signals of a plurality of different images according to the feature of each image.

Further, in each of the above embodiments, the filter and edge detection circuit are formed with a one-dimensional construction, but they may be formed with a 2-dimensional construction. The construction of a 2-dimensional filter is extremely complicated, but can be relatively easily realized by use of an image signal processing DSP.

As described above, according to this invention, an image whose latitude is improved by effectively reducing the influence of the nonuniformity of illumination without forcedly emphasizing the edge portion of the image can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image signal processing device comprising:
   logarithmic compression means for subjecting an input image signal containing a color signal to logarithmic compression;
   filtering means for filtering the input image signal which is subjected to the logarithmic compression by said logarithmic compression means;
   filtering characteristic setting means for space-variantly setting a band pass characteristic of said filtering means within one frame of the image signal according to a feature portion of the input image signal; and
   dynamic range/gain control means for controlling a dynamic range and a gain of the input image signal which is filtered by said filtering means.

2. An image signal processing device according to claim 1, wherein said filtering characteristic setting means includes high frequency component detection means for detecting a high frequency component of the input image signal, which sets the band pass characteristic of said filtering means to suppress only a low frequency component of the input image signal when an output of said high frequency component detection means is smaller than a given value, and which sets the band pass characteristic of said filtering means to also suppress the higher frequency component of the input image signal when an output of said high frequency component detection means is larger than a given value.

3. An image signal processing device according to claim 2, wherein said high frequency component detection means includes high-pass filter means for extracting the high frequency component of the input image signal, weighting means for weighting an output of said high-pass filter means according to the distance from the central pixel position, and total sum deriving means for deriving the total sum of weighted signals.

4. An image signal processing device comprising:
logarithmic compression means for subjecting an input image signal containing a color signal to logarithmic compression;
filtering means for filtering the input image signal which is subjected to the logarithmic compression by said logarithmic compression means;
filtering characteristic setting means for adaptively setting a band pass characteristic of said filtering means according to a feature of the input image signal;
a multiplier for multiplying the input image signal filtered by said filtering means by a coefficient;
a subtracter for subtracting an output of said multiplier from the input image signal which is subjected to the logarithmic compression by said logarithmic compression means;
multiplication coefficient deriving means for deriving a multiplier coefficient used in said multiplier; and
dynamic range/gain control means for controlling a dynamic range and a gain of an output signal of said subtracter.

5. An image signal processing device according to claim 4, wherein said multiplication coefficient deriving means includes means for deriving a multiplication coefficient based on a characteristic value of an output signal of said subtracter and a first preset value which is previously set.

6. An image signal processing device according to claim 4, wherein said dynamic range/gain control means includes multiplier means for effecting the multiplication with respect to an output signal of said subtracter and outputting the result of multiplication, addition means for effecting the addition of an output signal of said multiplier means and outputting the result of addition, average value detection means for detecting the average value of output signals of said addition means, standard deviation detection means for detecting the standard deviation of an output signal of said addition means, added value setting means for deriving the added value of said addition means based on the detected average value and a second preset value, and multiplied value setting means for deriving a multiplied value of said multiplication means based on the detected standard deviation and a third preset value.

7. An image signal processing device according to claim 6, wherein said added value deriving means and multiplied value deriving means further include preset value determination means for permitting the first, second and third preset values to be determined from the exterior of the device.

8. An image signal processing device according to claim 6, wherein said added value deriving means and multiplied value deriving means further include means for determining the first, second and third preset values according to the input image signal.

9. An image signal processing device according to claim 5, wherein said dynamic range/gain control means includes multiplier means for effecting the multiplication with respect to an output signal of said subtracter and outputting the result of multiplication, addition means for effecting the addition of an output signal of said multiplier means and outputting the result of addition, average value detection means for detecting the average value of output signals of said addition means, standard deviation detection means for detecting the standard deviation of an output signal of said addition means, added value setting means for deriving the added value of said addition means based on the detected average value and a second preset value, and multiplied value setting means for deriving a multiplied value of said multiplication means based on the detected standard deviation and a third preset value.

10. An image signal processing device comprising:
logarithmic compression means for subjecting an input image signal containing a color signal to logarithmic compression;
local average value detection means for deriving a local average value of the input image signal which is subjected to the logarithmic compression by said logarithmic compression means;
a high-pass filter for extracting a high frequency component from the input image signal which is subjected to the logarithmic compression by said logarithmic compression means;
a multiplier for multiplying an output of said high-pass filter by a coefficient;
an adder for adding an output of said multiplier to the input image signal which is subjected to the logarithmic compression by said logarithmic compression means;
coefficient deriving means for deriving a coefficient used in said multiplier; and
dynamic range/gain control means for controlling a dynamic range and a gain of an output signal of said adder.

11. An image signal processing device according to claim 10, wherein said dynamic range/gain control means includes a multiplier for effecting a multiplication with respect to an output signal of said adder and outputting a result of multiplication, an adder for effecting an addition of an output signal of said multiplier and outputting a result of addition, average value detection means for detecting an average value of output signals of said adder, standard deviation detection means for detecting a standard deviation of an output signal of said adder, added value setting means for deriving an added value of said adder based on the detected average value and a second preset value, and multiplied value setting means for deriving a multiplied value of said multiplier based on the detected standard deviation and a third preset value.

12. An image signal processing device according to claim 10, wherein said coefficient deriving means includes a means for deriving a coefficient by use of the local average value, added value and multiplied value.

13. An image signal processing device according to claim 10, wherein said added value deriving means and multiplied value deriving means further include preset value determination means for permitting the first and second preset values to be determined from the exterior of the device.

14. An image signal processing device according to claim 10, wherein said added value deriving means and multiplied value deriving means further include means for determining the first and second preset values according to the input image signal.

15. An image signal processing device comprising:
    logarithmic compression means for subjecting an input image signal containing a color signal to logarithmic compression;
    filtering means for filtering the input image signal which is subjected to the logarithmic compression by said logarithmic compression means;
    filtering characteristic setting means for adaptively setting a band pass characteristic of said filtering means according to a feature of the input image signal; and
    dynamic range/gain control means for controlling a dynamic range and a gain of the input image signal which is filtered by said filtering means;
    said filtering characteristic setting means including high frequency component detection means for detecting a high frequency component of the input image signal, which sets the band pass characteristic of said filtering means to suppress only a low frequency component of the input image signal when an output of said high frequency component detection means is smaller than a given value, and which sets the band pass characteristic of said filtering means to also suppress the higher frequency component of the input image signal when an output of said high frequency component detection means is larger than a given value.

16. An image signal processing device according to claim 15, wherein said high frequency component detection means includes a high-pass filter means for extracting the high frequency component of the input image signal, weighting means for weighting an output of said high-pass filter means according to the distance from the central pixel position, and total sum deriving means for deriving the total sum of weighted signals.

* * * * *